United States Patent
Ferron

(10) Patent No.: US 10,740,831 B1
(45) Date of Patent: Aug. 11, 2020

(54) METHOD, MEDIUM, AND SYSTEM FOR CONTEXT BASED CONFIGURATION OF CONTENT

(71) Applicant: AMAZON TECHNOLOGIES, INC., Seattle, WA (US)

(72) Inventor: Luc Ferron, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 429 days.

(21) Appl. No.: 14/617,760

(22) Filed: Feb. 9, 2015

(51) Int. Cl.
*G06Q 30/00* (2012.01)
*G06Q 30/06* (2012.01)
*H04L 29/08* (2006.01)

(52) U.S. Cl.
CPC ..... *G06Q 30/0641* (2013.01); *G06Q 30/0633* (2013.01); *G06Q 30/0635* (2013.01); *H04L 67/02* (2013.01)

(58) Field of Classification Search
CPC ........... G06Q 30/0641; G06Q 30/0633; G06Q 30/0635
See application file for complete search history.

(56) References Cited

U.S. PATENT DOCUMENTS

| | | | | |
|---|---|---|---|---|
| 5,899,975 A * | 5/1999 | Nielsen | ................... | G10L 13/00 704/270.1 |
| 6,957,390 B2 * | 10/2005 | Tamir | ................... | G06F 11/3438 707/E17.108 |
| 7,295,995 B1 * | 11/2007 | York | ..................... | G06Q 30/02 705/26.8 |
| 8,577,753 B1 * | 11/2013 | Vincent | .................. | G06Q 30/02 705/26.1 |
| 2004/0117436 A1 * | 6/2004 | Newman | ................ | G06Q 10/06 709/203 |
| 2006/0053126 A1 * | 3/2006 | Baca | .................... | A61B 8/4281 |
| 2007/0156747 A1 * | 7/2007 | Samuelson | ....... | G06F 17/30873 |
| 2007/0240041 A1 * | 10/2007 | Pearson | ............... | G06F 40/194 715/209 |
| 2009/0254529 A1 * | 10/2009 | Goldentouch | ........ | G06F 17/241 |

(Continued)

OTHER PUBLICATIONS https://stackoverflow.conn/questions/4189868/what-does-media-screen-and-max-width-1024px-mean-in-css (Year: 2010).*

(Continued)

*Primary Examiner* — Matthew E Zimmerman
(74) *Attorney, Agent, or Firm* — Lindauer Law, PLLC

(57) ABSTRACT

Techniques are described for configuring content page(s) based on context information. A request for page(s) may be analyzed to determine context information, such as the requesting device type, application type, and so forth. The context information may be employed to evaluate conditional statement(s) to determine a configuration of feature(s) of the page(s), the conditional statement(s) included in configuration file(s). In some cases, a configuration file may be associated with the particular user interface (UI) to be presented, such as an online marketplace. Information in a configuration file for a particular UI may override information in a generic configuration file that is applicable to configure multiple UIs. Techniques are also described for using test module(s) to validate the operation of a UI in response to an action, instead of making call(s) to external service(s) in response to an action.

17 Claims, 14 Drawing Sheets

(56) References Cited

U.S. PATENT DOCUMENTS

| | | | | |
|---|---|---|---|---|
| 2010/0198768 | A1* | 8/2010 | Zhou | G06F 9/4446 706/47 |
| 2011/0167332 | A1* | 7/2011 | Nickas, Jr. | G06F 40/151 715/234 |
| 2012/0290936 | A1* | 11/2012 | Mahmud | G06F 8/30 715/733 |
| 2013/0212487 | A1* | 8/2013 | Cote | G06F 9/451 715/745 |
| 2013/0219024 | A1* | 8/2013 | Flack | H04L 67/2819 709/219 |
| 2013/0326337 | A1* | 12/2013 | Lehmann | G06F 16/9577 715/236 |
| 2015/0074518 | A1* | 3/2015 | Rumsey | G06F 40/106 715/235 |
| 2015/0378575 | A1* | 12/2015 | Kaplinger | G06F 16/00 715/760 |
| 2016/0217110 | A1* | 7/2016 | Parag | G06F 3/04842 |

OTHER PUBLICATIONS https://web.archive.org/web/20120405114908/https://www.ifixit.com/Help/Header_and_Footer_Styling (Year: 2012).*
https://stackoverflow.com/questions/4189868/what-does-media-screen-and-max-width-1024px-mean-in-css (Year: 2010).*
http://lists.xml.org/archives/xml-dev/200709/msg00125.html (Year: 2007).*
https://www.w3.org/wiki/index.php?title=CSS/Properties/visibility &oldid=50649 (Year: 2011).*
Chen, Yu, et al. "Adapting web pages for small-screen devices." IEEE internet computing 9.1 (2005): 50-56. (Year: 2005).*
Snover, Colin, "Mocking data with Intern", SitePen [blog]. Jul. 14, 2014. Retrieved on Jan. 19, 2015, at <URL: http://www.sitepen.corn/blog/2014/07/14/mocking-data-with-intern/>.
Soapui by Smartbear, "Mock Services", Retrieved on Jan. 19, 2015, at <URL: http://www.soapui.org/Getting-Started/mock-services.html>.

* cited by examiner

METHOD, MEDIUM, AND SYSTEM FOR CONTEXT BASED CONFIGURATION OF CONTENT

BACKGROUND

With the increasing number and variety of products available for purchase via web sites or other network-connected applications, more users are opting to purchase products and services online instead of patronizing traditional brick-and-mortar businesses. As network speeds increase and device capabilities improve, customers who shop online may come to expect faster and more reliable presentation of content describing products and services. In many cases, a delay or error in loading content may lead a potential customer to grow impatient and shop elsewhere, resulting in lost business. Accordingly, the providers of online shopping services may strive to improve the speed and reliability of content presentation over a network.

Figure 1:
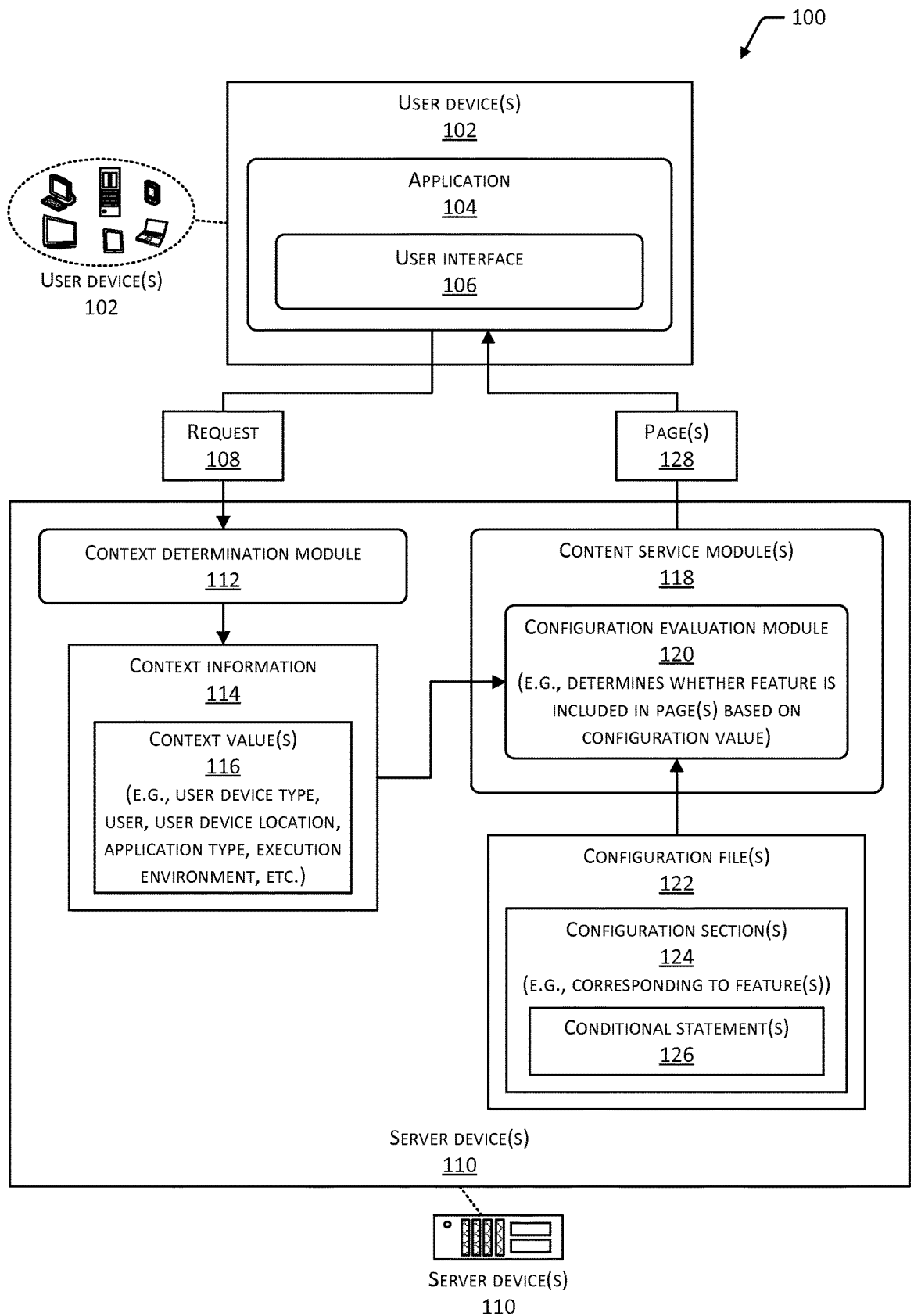
FIG. 1 depicts an environment for configuring one or more pages of content based on context information.

Certain implementations and embodiments will now be described more fully below with reference to the accompanying figures in which various aspects are shown. Aspects may be implemented in many different forms and should not be construed as limited to the implementations set forth herein. Like reference numbers refer to like elements throughout this disclosure.

DETAILED DESCRIPTION

This disclosure describes implementations of systems, devices, methods, and computer-readable media for configuring one or more pages of content based on context information. A user device may communicate with one or more server devices to request one or more pages of content to be presented through the user device. In some cases, the request may be a Hypertext Transfer Protocol (HTTP) request identifying one or more web pages to be presented through a web browser executing on the user device. Alternatively, the request may be a communication generated by some other application (e.g., a native application) executing on the user device, and the request may indicate one or more pages of content to be presented via the application. Processes running on the server device(s) may analyze the request and determine context information such as a device type of the user device (e.g., mobile, desktop, tablet, phone, and so forth), an application type of the application (e.g., web application, native application, and so forth), a current user, or a location of the user device.

Based on the context information, one or more pages of content may be generated. In some implementations, one or more features of the page(s) may be configured based on the context information. Such configuration may employ one or more configuration files that describe how the feature(s) are to be configured based on the context information. For example, the configuration file(s) may include a conditional statement indicating that if the user device has a device type of mobile, the page(s) are to be configured to omit feature(s) to enable gift wrapping of a purchased item. As another example, the configuration file(s) may include a conditional statement indicating that if the user device is located in France, the page(s) are to be configured to include a particular header or footer (e.g., in the appropriate language). The configuration of the page(s) may be performed according to any number of dimensions, in which each dimension is a possible set of context values related to a particular characteristic of the user device, the request, or the execution environment.

In some cases, an environment may host or support multiple user interfaces (UIs). For example, an online shopping service may host any number of online marketplaces each corresponding to a subsidiary merchant. Each online marketplace may be accessible to a user via a web site or an application running on user device(s). In some cases, different online marketplaces may be configured differently to include different features. For example, an online marketplace for merchant X may provide a gift wrap feature whereas an online marketplace for merchant Y may not provide the gift wrap feature. In some implementations, multiple configuration files may include configuration information used to configure the page(s) for different online marketplaces. Following the above example, a first configuration file may be associated with merchant X and may indicate that the gift wrap feature is to be included given certain context values of dimensions of the context information. A second configuration file may be associated with merchant Y and may indicate that the gift wrap feature is to be omitted or included from that merchant's online marketplace, given a different set of context values than those specified in the first configuration file.

In some implementations, the multiple configuration files may be arranged hierarchically such that a lower level configuration file may at least partly override information included in a higher level configuration file. For example, a first configuration file may include a configuration section that indicates how a feature is to be configured given a certain set of context values. A second configuration file may include a configuration section that indicates how the feature is to be configured given a different set of context values. The first configuration file may describe the configuration of a generic set of pages. For example, the first configuration file may be applicable to a plurality of online marketplaces. The second configuration file may be specific to a particular online marketplace. When it is determined that the page(s) to be configured are page(s) of the particular online marketplace, the second configuration file may be accessed. The second configuration file may be employed instead of the first configuration file to configure one or more features for the online marketplace. In some implementations, multiple configuration files in a hierarchy may be collapsed or otherwise combined to generate a single configuration file that describes the configuration of a UI for a particular marketplace. The single configuration file may then be employed to configure the page(s) of content to be presented.

If the engineers or others who maintain an online marketplace for a particular merchant wish to configure the online marketplace based on a new context value, implementations facilitate the extension of the configuration system to support a new dimension having any number of possible context values. In some implementations, the new dimension may be supported by: modifying a context determination module to determine, based on a request, the current context value(s) associated with the new dimension; and adding one or more conditional statements into the configuration file corresponding to the particular online marketplace, where the conditional statement(s) determine configuration value(s) based on the current context value(s) for the new dimension. The configuration may then be generated for the online marketplace, based on the new dimension, without any need to alter other code or other configuration files corresponding to either a generic configuration or other online marketplaces. Accordingly, the hierarchy of configuration files may facilitate the creation of a new or different configuration for a particular online marketplace. In this way, implementations may contrast with a traditional configuration system in which the supported dimensions and context values may be coded into the system prior to its initial deployment.

This disclosure also describes implementations of systems, devices, methods, and computer-readable media for using test module(s) to modify a data state of one or more pages in response to an action performed through the page(s). A first set of pages may be generated to be presented within the UI of a web site or an application. The first set of pages may be generated according to a first data state. For example, the first set of pages may present a data state in which a particular user has logged into an online marketplace, placed an item in a shopping cart, and begun navigating a set of checkout pages. A request may be received indicating that the user has performed an action through the first set of pages, such as entering or changing a shipping address where the item is to be sent following purchase, removing an item from the cart, adding an item to the cart, changing the quantity of an item in the cart, adding or removing a payment method, and so forth. A second data state may be determined based on the action, and a second set of pages may be generated according to the second data state. For example, the second data state may indicate that a changed shipping address is invalid such that the UI presents an error message to indicate an invalid address. Alternatively, the second data state may indicate that the shipping address is valid such that the UI accepts the changed address.

In some cases, one or more content service modules may analyze the action and send the action (e.g., the changed shipping address) to one or more external services. The external service(s) may generate the second data state based on the action. For example, the external service(s) may determine whether the shipping address is valid or invalid and modify the data state accordingly.

Some implementations may provide a mediator module that enables the call to the external service(s) to be bypassed through the use of test module(s). In cases where the current execution environment is a test environment, the second data state may be determined based on test module(s) that modify the data state according to the action, instead of performing calls to the external service(s). For example, if the action is to change a shipping address to a new address in Italy, the test module(s) may include (e.g., hard-coded) logic that generates a modified data state indicating an invalid shipping address. The use of test module(s) instead of calls to the external service(s) may enable a web site or other software system to be developed and tested in cases where the external service(s) have not yet been implemented. In such cases, the test module(s) may be written to simulate expected or anticipated behavior of the external service(s). The use of test module(s) may also facilitate the testing of a web site or other software system by removing the effects of any potential variability of the external service(s). Accordingly, a change in the behavior of a software system that is under test using test module(s) may be attributed to the software system itself and not to the external service(s), thus isolating a potential bug and facilitating diagnosis and bug fixing.

FIG. 1 depicts an environment 100 in which implementations may operate. As shown in FIG. 1, the environment 100 may include one or more user devices 102. The user device(s) 102 may comprise any type of computing device, including but not limited to a personal computer, a smartphone, a tablet computer, a wearable computer, an implanted computer, a mobile gaming device, an electronic book (e-book) reader, an automotive computer, a desktop computer, a laptop computer, a game console, a home entertainment device, a network computer, a server computer, a mainframe computer, a distributed computing device (e.g., a cloud server), and so forth. Although examples herein may describe the user device(s) 102 as physical device(s), implementations are not so limited. In some cases, the user device(s) 102 may include one or more of a virtual computing environment, a hypervisor, an emulation, or a virtual machine executing on one or more physical computing devices. In some cases, two or more of the user devices 102 may comprise a cluster, cloud, farm, or other grouping of multiple devices that coordinate operations to provide load balancing, failover support, parallel processing capabilities, shared storage resources, or other aspects. The user device(s) 102 are described further with reference to FIG. 9.

In some implementations, the user device(s) 102 may execute an application 104. The application 104 may provide any type of functionality, including but not limited to online shopping, e-commerce, product or service reviews, social networking, content publication, weblogs, social networking, media presentation (e.g., audio or video playback), games, or communications (e.g., email, text messaging, and so forth).

In some cases, the application 104 may provide a UI 106 for presenting information to user(s). The UI 106 may present information in any form, including but not limited to visual information, audio information, or haptic information. The UI 106 may present information via a display or other component(s) of the user device(s) 102, or via component(s) that are external to the user device(s) 102. Although examples may describe the UI 106 as a component of the application 104, in some implementations the UI 106 may execute separately from the application 104 to present information received from the application 104.

The application 104 and the UI 106 may be described using any programming language. In some cases, one or both of the application 104 or the UI 106 may be a native application that is compiled, linked, or otherwise built from source code to generate machine-executable binary instructions configured to execute on the processor(s) and within the operating system (OS) of the user device(s) 102. In some cases, one or both of the application 104 or the UI 106 may be written in a programming language that compiles to an intermediate language (e.g., bytecodes) that executes within a runtime application such as a Java Virtual Machine (JVM), C # runtime, or any other runtime, interpreter, virtual machine, or execution engine running on the user device(s) 102. In some cases, one or both of the application 104 or the UI 106 may include any number of executable instructions in a scripting language or interpreted language, such as JavaScript, ActiveScript, VBScript, Perl, and so forth. In such cases, one or both of the application 104 or the UI 106 may execute within a runtime, interpreter, virtual machine, scripting engine, and so forth.

In some cases, one or both of the application 104 or the UI 106 may be configured to execute, at least partly, in a web browser or other container for the presentation of web content, such as a WebView or UIWebView class. Accordingly, one or both of the application 104 or the UI 106 may include dynamic scripting or programmatic elements described using any programming language, such as JavaScript, ActiveScript, VBScript, Perl, and so forth. Implementations support the use of any web browser to execute one or both of the application 104 or the UI 106. Such a web browser may include, but is not limited to, one or more of the following: Mozilla Firefox; Microsoft Internet Explorer; Google Chrome; Apple Safari; Rockmelt; and so forth. Implementations also support the use of a web browser, such as the Amazon Silk browser, in which the processing of content is performed partly on the user device(s) 102 and partly on other computing device(s). In cases where one or both of the application 104 or the UI 106 is to be presented, at least partly, within a web browser or other container for the presentation of web content, one or both of the application 104 or the UI 106 may include any number of web pages that are described at least in part using a markup language such as any version of Hypertext Markup Language (HTML), Dynamic HTML (DHTML), Extensible HTML (XHTML), Extensible Markup Language (XML), and so forth.

The application 104, or the UI 106, may generate a request 108. The request 108 may identify content to be presented in the UI 106. In some cases the request 108 may be a HTTP request for web content. The request 108 may include a Uniform Resource Identifier (URI) such as a Uniform Resource Locator (URL) or Uniform Resource Name (URN) that identifies a network location of the requested content. The request 108 may be sent over one or more networks (not shown) to one or more server devices 110.

The server device(s) 110 may be any type of computing device, including but not limited to those types of computing device described above with reference to the user device(s) 102. Although examples herein may describe the server device(s) 110 as physical device(s), implementations are not so limited. In some cases, the server device(s) 110 may include one or more of a virtual computing environment, a hypervisor, an emulation, or a virtual machine executing on one or more physical computing devices. In some cases, two or more of the server device(s) 110 may comprise a cluster, cloud, farm, or other grouping of multiple devices that coordinate operations to provide load balancing, failover support, parallel processing capabilities, shared storage resources, or other aspects. The server device(s) 110 are described further with reference to FIG. 8.

The server device(s) 110 may execute a context determination module 112. The context determination module 112 may analyze the request 108 and determine context information 114 that describes a context of the request 108. The context information 114 may include one or more context values 116 that describe the context with respect to one or more dimensions. For example, the context information 114 may include context value(s) 116 for a location dimension, such that the context information 114 includes context value(s) 116 describing a current location of the user device 102. As another example, the context information 114 may include context value(s) 116 for a device type dimension, such that the context information 114 includes context value(s) 116 describing a device type (e.g., mobile, desktop, smartphone, tablet, etc.) of the user device 102. In some cases, the context information 114 may be determined based on the user agent header or other header information present in the request 108. The context information 114 may also be determined based on one or more parameters, one or more cookies, or other information included with the request 108.

In some implementations, the context determination module 112 may determine all possible context value(s) 116 based on the request 108. Alternatively, the context determination module 112 may determine those context value(s) 116 that are to be used to evaluate the conditional statements in the particular configuration file(s) to be employed in configuring page(s), as described further below.

Figure 2:
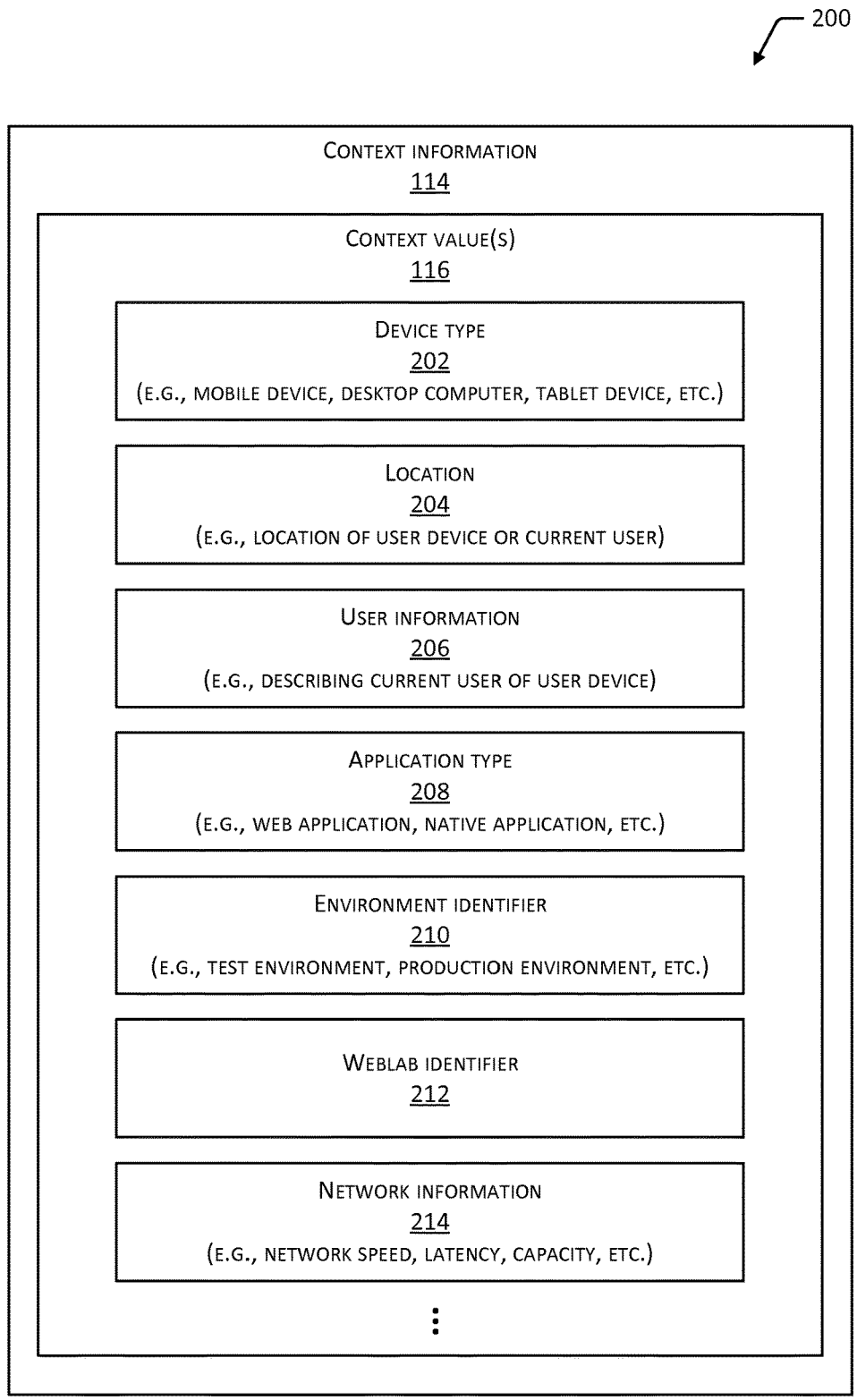
FIG. 2 depicts an example of context information that may be employed to configure one or more pages of content.

FIG. 2 depicts an example 200 of the context information 114. As shown in FIG. 2, the context information 114 may include one or more context values 116 for one or more dimensions. A dimension may be a characteristic of the request 108 or a characteristic of the current environment in which the request 108 is received and processed. A dimension may have any number of possible context values 116. For example, a location dimension may have a context value 116 describing the location of the user device 102 or the user. As another example, a device type dimension may have a context value 116 describing the particular device type of the user device 102 from among a set of possible device types such as mobile device, non-mobile device, smartphone, tablet, e-book reader, automotive computer, and so forth.

As shown in the example of FIG. 2, the context value(s) 116 may include a device type 202 of the user device 102 that originated the request 108. The device type 202 may indicate whether the user device 102 is a mobile device, a desktop computer (or other less mobile device), a phone, a tablet computer, and so forth. The device type 202 may include information at any level of specificity. For example, the device type 202 may indicate whether the user device 102 is within class or category of mobile devices or non-mobile devices. The device type 202 may also indicate whether the user device 102 is a more specific type of device such as a phone, tablet, e-book reader, desktop computer, automotive computer, and so forth. The device type 202 may also indicate a particular brand or model of the user device 102. In some cases, the device type 202 may describe a particular hardware or software configuration of the user device 102. For example, the device type 202 may describe an OS currently running on the user device 102.

In some implementations, the context value(s) 116 may include a location 204 of the user device 102 or of a user of the user device 102. The location 204 may be determined, to any degree of specificity, using any technique. For example, the user device 102 may include location sensor(s), transceiver(s), other hardware component(s), or other software component(s) configured to determine the location 204 using one or more of the following: an inertial navigation system, a dead-reckoning navigation system, a network positioning system, a radio position finding system, a satellite-based navigation system, an accelerometer system, a gyroscope system, and so forth. The satellite-based system may include one or more of a Global Positioning System (GPS) receiver, a Globalnaya Navigatsionnaya Sputnikovaya Sistema (GLONASS) receiver, a Galileo receiver, an Indian Regional Navigational Satellite System, and so forth. The location 204 may then be provided in the request 108. The location 204 may also be determined by the context determination module 112 using geolocation based on an Internet Protocol (IP) address of the user device 102. In some cases, the location 204 of the user device 102 or a user of the user device 102 may be determined based on previously collected information describing the user device 102 or the user.

In some implementations, the context value(s) 116 may include user information 206 that describes a current user of the user device 102 when the request 108 is generated. The user information 206 may include a user identifier (ID) such as a login name, identification number, personal name, gamer tag, account name, or other types of user IDs. The user ID may uniquely identify the user of the user device 102. The user information 206 may also describe a particular class, category, or type of the current user. For example, the user information 206 may indicate an age of the user, such as whether the user is a minor or an adult, to enable different page configuration(s) based on user age. As another example, the user information 206 may indicate whether the user is a member of a particular group of users such as a prime member, premium subscriber, preferred customer, frequent customer, and so forth. In some implementations, the user information 206 may indicate a role of the user, such as a root user, admin, or normal user on the user device 102. In such cases, the UI 106 may be differently configured based on the user role.

The context value(s) 116 may include an application type 208 indicating a type of the application 104 that generated the request 108. For example, the application type 208 may indicate that the application 104 is a web application executing within a web browser or other container for presenting web content. Alternatively, the application type 208 may indicate that the application 104 is a native application executing on the user device 102, or a native application that includes a container for presenting web content.

The context value(s) 116 may include an environment identifier (environment ID) 210 that indicates a current environment in which the request 108 is being analyzed, such as the environment 100 in which the server device(s) 110 operate. In some cases, the environment ID 210 may indicate that the current environment is a test environment such that the generated content is not being presented to end users outside of a software development organization. Alternatively, the environment ID 210 may indicate that the current environment is a production environment such that the generated content is presented to end users such as customers of an online marketplace. In some cases, the environment ID 210 may indicate that the current environment is one among a set of possible internal test environments for which content may be configured differently, such as an alpha test environment, beta test environment, gamma test environment, and so forth. The context value(s) 116 may also include other information describing the request 108, the user device 102, the application 104, the UI 106, or the current environment in which the request 108 is processed.

The context value(s) 116 may include a weblab identifier (weblab ID) 212 that indicates a weblab corresponding to the user or the request 108. A weblab may be a subset of users of the UI 106, such as a subset of customers of an online marketplace. A weblab may also be described as a subset of the requests 108 received for page(s). In some implementations, the requests 108 received from users may be divided into any number of weblabs, and different versions of the UI 106 may be presented to different weblabs. For example, a feature may be presented to a first weblab and not presented to a second weblab, or different weblabs may be shown different versions of a feature. Weblabs may also be presented with UIs 106 that differ in the arrangement of features, controls, or other content. In some cases, a second weblab may be presented with a different configuration than a first weblab, to enable functional testing, performance testing, usability testing, or other types of testing of the different configurations. In some cases, a feature may be presented to a first weblab and not presented to a second weblab, and user response to the feature may be measured. For example, a determination may be made whether inclusion (or exclusion) of the feature increases or decreases sales or traffic through an online marketplace. In some cases, different weblabs may be associated with a different set of backend (e.g., non-user-facing) processing modules to generate information for presentation in the UI 106. For example, backend module(s) for a first weblab may process sale transactions differently than the backend module(s) for a second weblab, even though users within both weblabs may be presented the same UI 106.

In some implementations, the context value(s) 116 may include network information 214 describing the network over which the request 108 was received. The network information 214 may be measured using any method, and may include a description of the speed, latency, capacity, type, supported protocol(s), or other aspects of the network. Such network information 214 may enable the page(s) of the UI 106 to be configured differently in response to different network conditions. The context value(s) 116 may also include other types of information, such as the name or version of the application 104 that generated the request 108. The context value(s) 116 may also describe a software or hardware configuration of the server device(s) 110, such as the OS executing on the server device(s) 110 where the content service module(s) 118 or the configuration evaluation module 120 are executing.

In cases where the context information 114 is associated with a user, implementations may ensure the privacy of the context information 114 by requesting the user's permission to use, store, analyze, or otherwise process the context information 114. Such a request may be configured as an "opt in," such that the context information 114 may not be processed prior to receiving explicit permission to do so from the user associated with the context information 114. Alternatively, implementations may employ an "opt out" model, such that the processing of the context information 114 is discontinued on receiving a request to do so from the user.

Returning to FIG. 1, the server device(s) 110 may execute one or more content service modules 118 that are configured to generate or otherwise determine content to be presented via the UI 106. The content service module(s) 118 may provide a web service, an application service, or other types of services to determine content. In some implementations, the content service module(s) 118 may include a configuration evaluation module 120. The configuration evaluation module 120 may access the context information 114 and one or more configuration files 122 to determine a configuration for the content. In some implementations, the configuration file(s) 122 may be separate from the program logic of the content service module(s) 118 or the configuration evaluation module 120. The configuration file(s) 122 may be stored in memory on the server device(s) 110, or elsewhere, in a location that is accessible by the content service module(s) 118 or the configuration evaluation module 120. In some cases, configuring the content may include determining whether to include one or more features in the generated content. Configuring the content may also include determining a particular manner in which the content is to be configured for presentation. The features to be configured may include, but are not limited to, one or more of the following:

A pipelining feature indicating whether the content is to be presented according to an asynchronous JavaScript and XML (AJAX) technique;

A multi-page feature indicating whether the content is to be presented in a single page or across multiple pages;

A header feature indicating whether the content is to be presented with a particular header, and indicating a URL of the header;

A footer feature indicating whether the content is to be presented with a particular footer, and indicating a URL of the footer;

A shopping cart feature indicating whether the content is to include a shopping cart that is employable to indicate items for purchase, and indicating a URL of the shopping cart to be presented;

An upsell feature indicating whether content is to include upsell option(s) such as offering to ship an item by a guaranteed date or time for an additional fee;

A gift wrap feature indicating whether the content is to include one or more controls to enable a user to request gift wrapping of an item and particular options for gift wrapping;

A gift message feature indicating whether the content is to include one or more controls to enable a user to specify a gift message to be delivered with the item to a recipient.

A gift message format feature indicating a length or format of the gift message;

A skin feature indicating a set of content assets to present in the UI 106, to provide a particular look and feel for the UI 106;

A phone ordering feature indicating whether and how phone ordering is to be enabled for a particular online marketplace;

An error page feature indicating particular location(s) (e.g., URL(s)) for error page(s) such as a 404 error page;

A logout page feature indicating a particular location (e.g., URL) of a logout page for the UI 106;

A login page feature indicating a particular location (e.g., URL) of a login or sign-in page for the UI 106;

A continue shopping feature indicating a particular location (e.g., URL) of a "continue shopping" page for the UI 106;

A customer service feature indicating a particular location (e.g., URL) for a help page or customer support page for the UI 106;

An order update feature indicating a particular location (e.g., URL) for a page that enables a user to update or cancel an order;

An order review feature indicating a particular location (e.g., URL) for a page that enables a user to review an order;

A show logo feature indicating whether a logo is to be presented for the online marketplace;

A save order preferences feature indicating whether a control is to be presented to enable the user to save order preferences;

A friends and family feature indicating whether friends and family information is to be presented on an address selection page;

A tax ID feature indicating whether the UI 106 prompts the user to enter a tax ID when shipping to international destinations;

An address accuracy feature indicating whether address accuracy information is to be presented in the UI 106;

An optional delivery preferences feature indicating whether the UI 106 is to present information for optional delivery preferences of the user;

An optional delivery fields feature indicating whether the optional delivery preferences information is to include particular fields;

An excluded address fields feature indicating whether certain fields are to be excluded from common address fields on a page. For example, on an edit page for a mobile address, the country field may be rendered separately from other text fields;

A prefetch feature indicating a number of prefetches to be performed for page(s) of the UI 106;

A shipment option feature indicating the shipment options to be presented, such as one day shipping, other time period options for shipping (e.g., 3-5 day shipping), upsell option(s) (e.g., "get it by Friday"), or presenting options without showing their additional cost;

An add credit card feature, indicating whether the add credit card feature is to be presented as a button, link, or other type of control;

A duplicate order check feature, indicating whether the system checks for duplicate orders;

A message to select address and payment feature, indicating a location on a page where the message to select address and payment information is to be presented;

An additional delivery options feature, indicating whether the online marketplace supports delivery to alternate locations such as stores, lockers, kiosks, and so forth;

A tax inclusive feature indicating whether presented prices are to include tax;

An in stock feature indicating whether information is to be presented regarding whether items are in stock, out of stock, or nearly out of stock;

A social network integration feature indicating whether and how social network information is to be integrated into the UI 106;

A promotion feature indicating whether and how the UI 106 is to present information regarding current promotions, sales, and so forth; or Other features for any other type of content to be presented via the UI 106.

In some implementations, the configuration file(s) 122 may include one or more configuration sections 124. Each configuration section 124 may correspond to a feature, and may include one or more conditional statements 126 indicating whether or how a feature is to be included based on the context information 114. In some cases, a conditional statement 126 may apply a Boolean condition indicating whether a feature is to be included in the generated content. For example, a conditional statement 126 may indicate that the gift wrap feature is to be omitted from the content if the device type 202 is mobile and the location 204 is in Argentina. In some cases, a conditional statement 126 may indicate a manner in which the feature is to be presented in the generated content. For example, a conditional statement 126 may indicate that the header is to include header content from a first URL if the location 204 is in Sweden, and header content from a second URL if the location 204 is in India.

Figure 3:
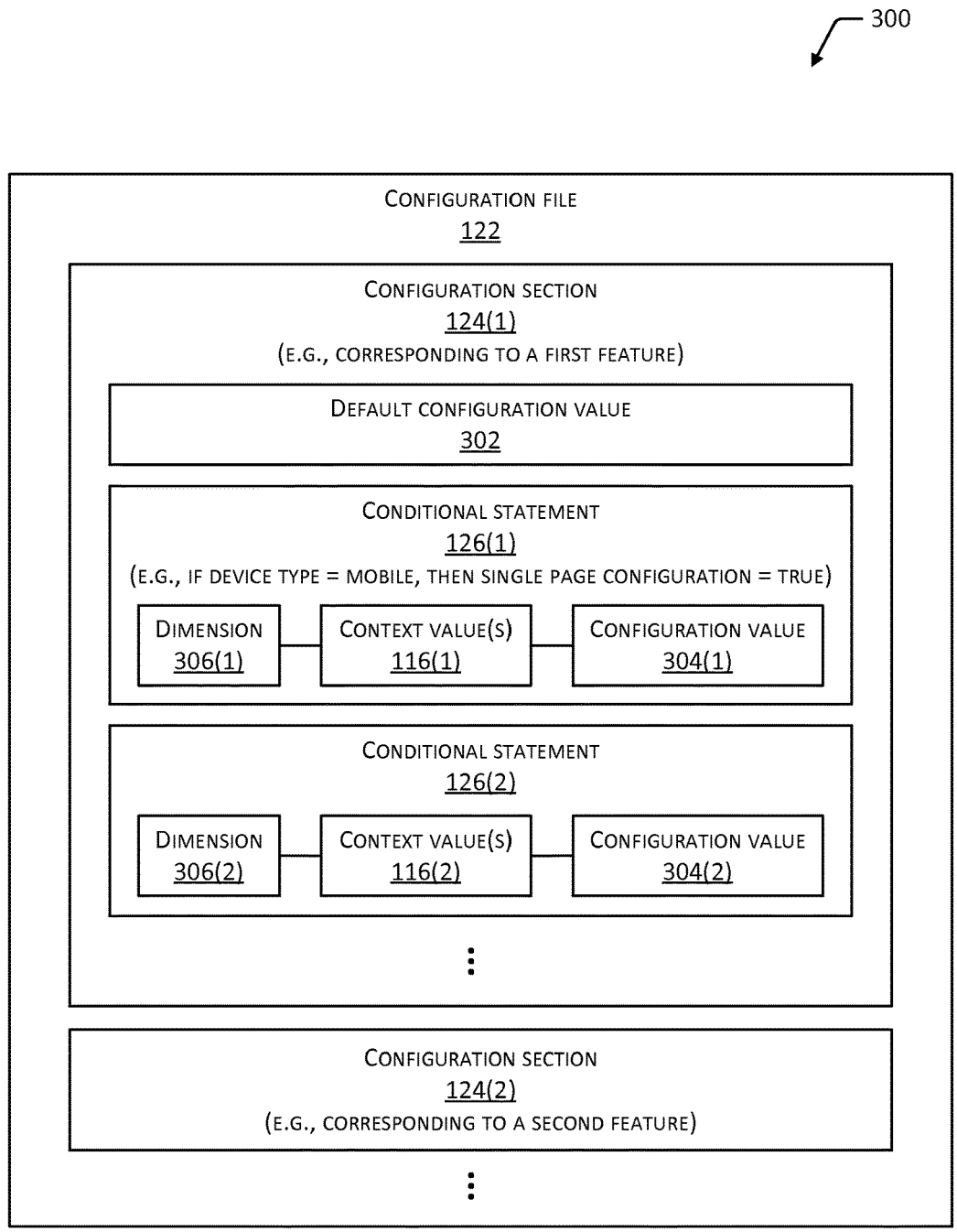
FIG. 3 depicts an example of a configuration file that may be employed to configure one or more pages based on context information.

FIG. 3 depicts an example 300 of the configuration file(s) 122. As shown in FIG. 3, a configuration file 122 may include any number of configuration sections 124 each corresponding to a feature to be configured. A configuration section 124 for a feature may include a default configuration value 302 for the feature. The default configuration value 302 may be employed if the configuration section 124 does not otherwise include any conditional statements 126 that are satisfied based on the context information 114. Each configuration section 124 may include any number of conditional statements 126. In some implementations, a conditional statement 126 may be arranged as an if-then statement associating a dimension 306 and one or more context values 116 with a configuration value 304 that results from the evaluation of the conditional statement 126 based on the context value(s) 116. For example, a conditional statement 126 may indicate that if the context value(s) 116 of a device type dimension 306 indicate that the device type 202 is mobile, then the configuration value 304 is set to "true" for the single page configuration feature such that the page(s) 128 are presented in a single page in the UI 106.

Figure 4:
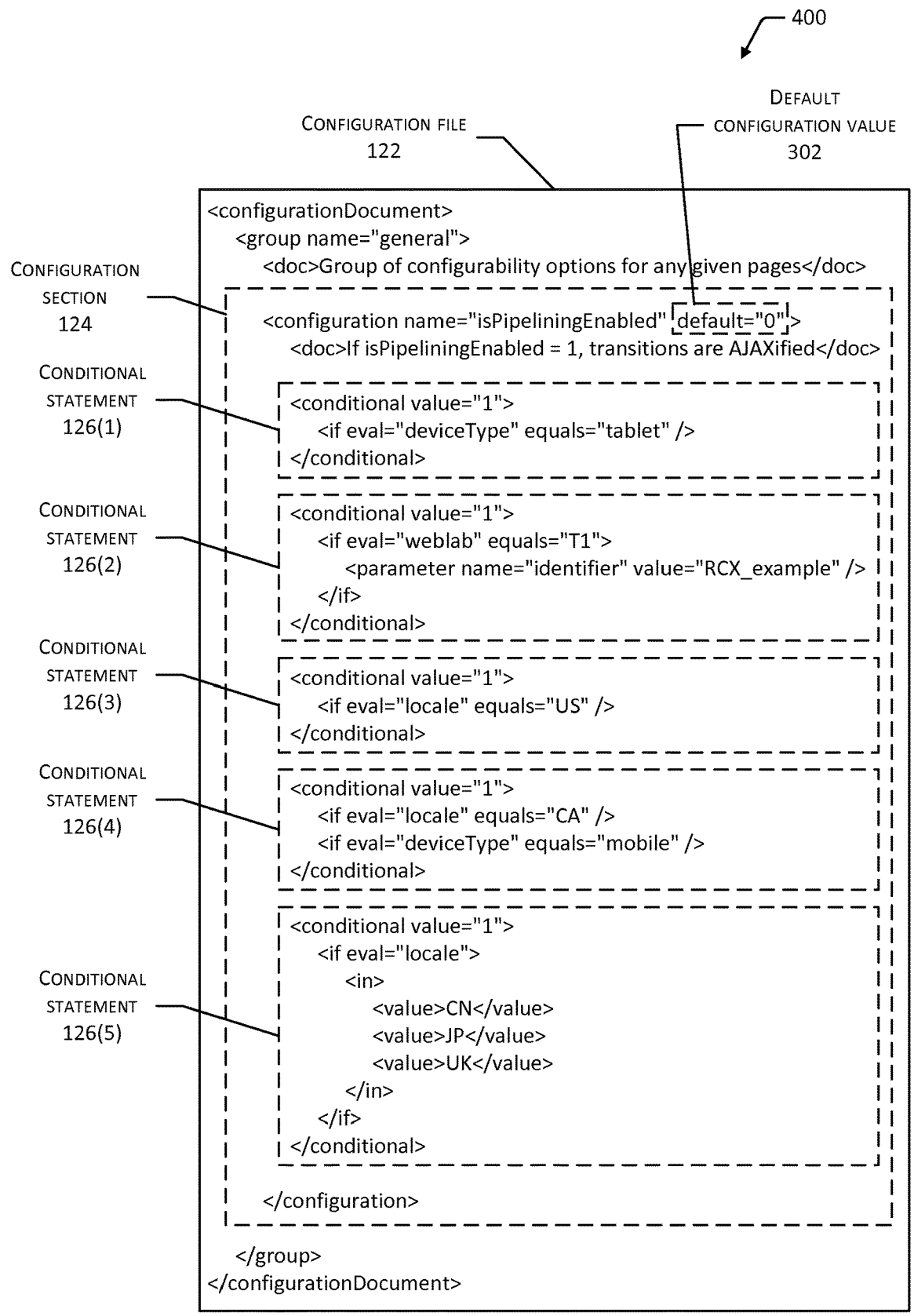
FIG. 4 depicts another example of a configuration file.

FIG. 4 depicts another example 400 of a configuration file 122. As shown in the example of FIG. 4, the configuration file 122 may include any amount of information that is listed between an opening tag (e.g., "<configurationDocument>") and a closing tag (e.g., "</configurationDocument>"). The configuration file 122 may also include one or more documentation lines that provide information regarding the configuration file 122 and its contents. The documentation lines may be ignored by the configuration evaluation module 120 or the content service module(s) 118 when determining the configuration of the content. In the example of FIG. 4, the documentation lines are indicated by "<doc>" and "</doc>" tags, but implementations support other indications of documentation.

In the example of FIG. 4, the configuration file 122 includes a configuration section 124 for determining whether pipelining (e.g., the use of AJAX technique(s)) is to be employed for the content. The configuration section 124 includes a default configuration value "0" (e.g., Boolean false) indicating that, by default, pipelining is not enabled. The configuration section 124 also includes a plurality of conditional statements 126 to be evaluated to determine the configuration value 304.

A conditional statement 126(1) indicates that the configuration value 304 is "1" (e.g., Boolean true) if the device type 202 is a tablet for the device type dimension 306. A conditional statement 126(2) indicates that the configuration value 304 is "1" if the weblab ID 212 is "T1" for the weblab dimension 306, further based on a parameter as described below. A conditional statement 126(3) indicates that the configuration value 304 is "1" if the location 204 is in the United States (US) for the location dimension 306. In some implementations, a conditional statement 126 may include multiple conditions (e.g., for multiple dimensions) that are evaluated according to a logical AND combination. In the example of FIG. 4, a conditional statement 126(4) indicates that the configuration value 304 is "1" if the location 204 is in Canada (CA) and if the device type 202 is a mobile device. A conditional statement 126 may also include multiple conditions that are evaluated according to a logical OR combination. In the example of FIG. 4, a conditional statement 126(5) indicates that the configuration value 304 is "1" if the location 204 is in China (CN), Japan (JP), or the United Kingdom (UK).

In some implementations, multiple conditional statements 126 in a configuration section 124 may be evaluated according to a logical OR combination, such that the configuration value 304 is set to the indicated value if at least one of the conditional statements 126 is satisfied. In some implementations, the conditional statements 126 may be evaluated in the order in which they are listed in the configuration section 124. In such cases, the evaluation may terminate when a first one of the conditional statements 126 is satisfied. For example, if the conditional statement 126(1) is satisfied (e.g., the device type 202 is a tablet) the subsequently listed conditional statements 126(2)-126(5) may not be evaluated. If none of the conditional statements 126 in a configuration section 124 is satisfied, the default configuration value 302 may be employed as the configuration value 304 for configuring the feature.

In some implementations, one or more dimensions 306 may be parameterized dimensions, such that the conditional statement(s) 126 for a dimension 306 include an additional evaluation of a parameter. For example, the conditional statement 126(2) shown in FIG. 4 includes a condition that "weblab" equals "T1" with respect to an additional parameter named "identifier". The conditional statement 126(2) may be evaluated based on these two pieces of information, such that the configuration value 304 is set to "1" if the weblab identified as "RCX_example" equals "T1". A conditional statement 126 may include any number and type of parameters that are employed to determine the configuration value 304. In some implementations, a parameterized dimension may be employed to differently configure a UI 106 for different subsidiaries of a parent company. In such cases, the different parameter values may correspond to the different subsidiaries.

Figure 5:
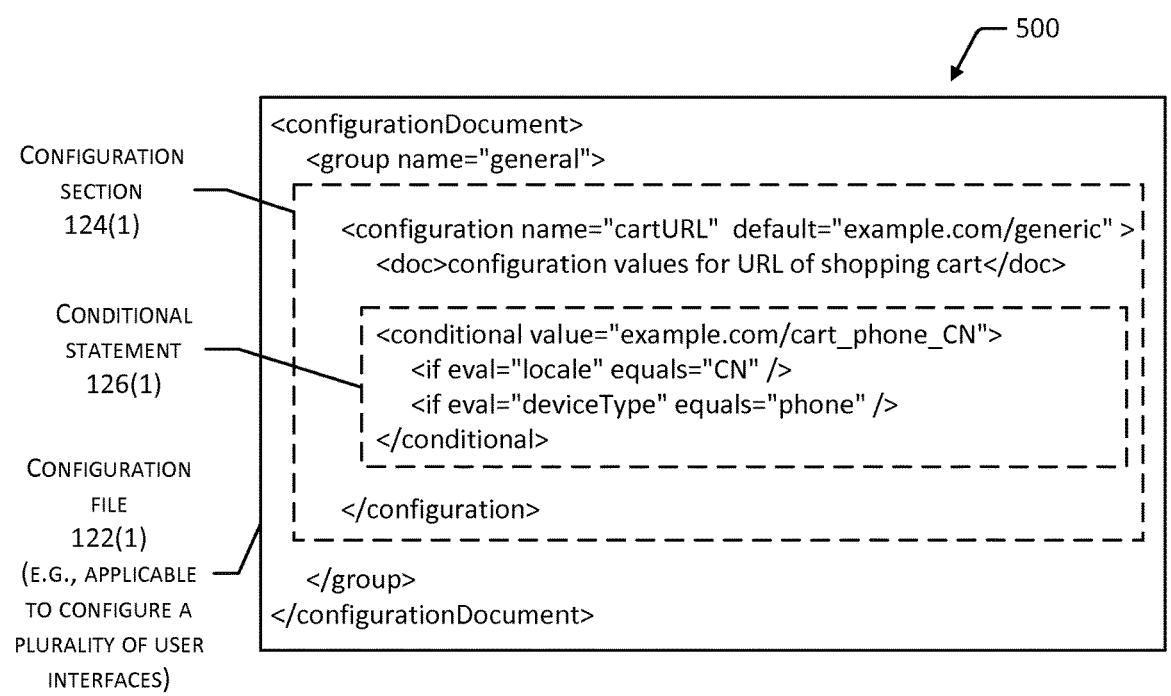
FIG. 5 depicts an example of two configuration files in which the second configuration file at least partly overrides configuration information included in the first configuration file.
Figure 5:
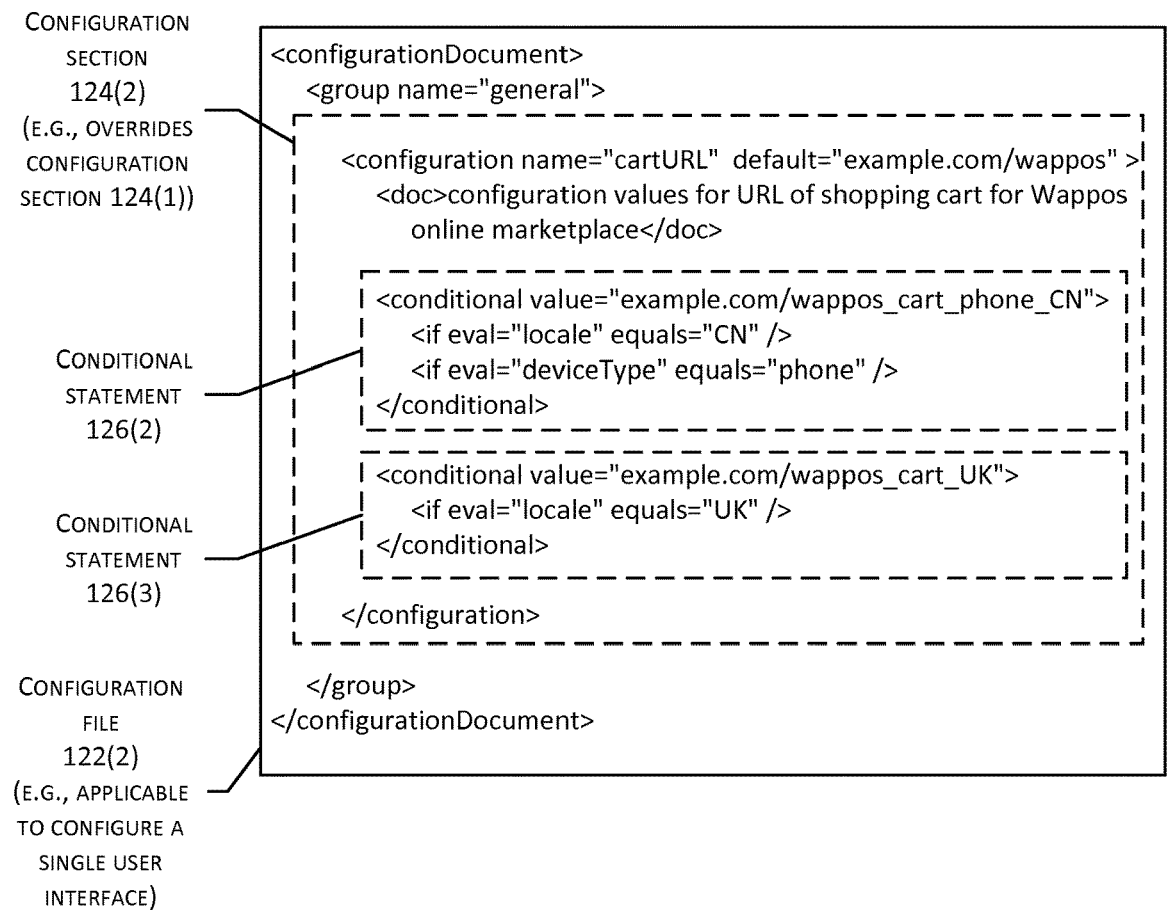

FIG. 5 depicts an example 500 of two configuration files 122. Some implementations may employ multiple configuration files 122 to configure a feature in presented content, where the multiple configuration files 122 correspond to a hierarchy of configuration options. The example of FIG. 5 depicts a first (e.g., higher level) configuration file 122(1) and a second (e.g., lower level) configuration file 122(2). The first configuration file 122(1) may be employable to configure a variety of online marketplaces, or other UIs 106, within a computing environment. The second configuration file 122(2) may be employable to configure a single online marketplace, or a single UI 106, within the computing environment. In the example of FIG. 5, the first configuration file 122(1) provides a generic configuration, and the second configuration file 122(2) provides a more specific configuration for a particular online marketplace of a merchant "Wappos".

The information in the second configuration file 122(2) may at least partly override the information in the first configuration file 122(1). Overriding may include employing the information in the second configuration file 122(2) instead of corresponding information in the first configuration file 122(1). In the example of FIG. 5, the configuration files 122(1) and 122(2) include configuration sections 124(1) and 124(2) respectively. The configuration sections 124(1) and 124(2) include different sets of conditional statements 126 that provide a different configuration value 304 based on context values 116 for location 204 and device type 202. For example, the configuration section 124(1) includes a single conditional statement 126(1), and the configuration section 124(2) includes two conditional statements 126(2) and 126(3). The configuration evaluation module 120 or the content service module(s) 118 may analyze the request 108 to determine that the requested content is for a particular UI 106 such as the particular online marketplace associated with a merchant (e.g., Wappos). In such cases, the configuration evaluation module 120 may access the configuration file 122(2) that is specific to the particular UI 106 to be presented. In cases where the configuration file 122(2) includes a configuration section 124(2) for configuring a feature, the configuration section 124(2) may be employed instead of the (e.g., generic) configuration section 124(1) of the configuration file 122(1). In cases where the configuration file 122(2) does not include a configuration section 124(2) for a feature, the configuration section 124(1) may be employed to configure the feature. Overriding is described further with respect to FIGS. 11 and 12.

Although the examples herein describe two levels of configuration files 122 in a hierarchy, such as a generic configuration file 122(1) and a UI-specific configuration file 122(2), implementations support any number of levels in a hierarchy of configuration files 122. In a hierarchical organization of configuration files 122, the information in the lowest level configuration file 122 may override corresponding information in any number of higher level configuration files 122. Overriding may include replacing any number of conditional statements 126 with other conditional statement(s) 126. Overriding may also include modifying any number of conditional statements 126 to alter one or more of the dimension 306, the context value(s) 116, or the configuration value 304 included in the modified conditional statement(s) 126.

In some implementations, the configuration sections 124 may be arranged in groups within the configuration file(s) 122. In the examples of FIGS. 4 and 5, a group of configuration sections 124 is indicated by "<group>" and "</group>" tags. Implementations also support other methods for designating a group. A group may also have a name. For example, the configuration section(s) 124 for features related to gifting (e.g., gift wrapping, gift messages, etc.) may be included in a group named "gifting". In some implementations, information from a lower level configuration file 122 may override corresponding information in a higher level configuration file 122 if the corresponding information is designated to be part of the same group. For example, as shown in FIG. 5, the conditional statement 126(2) may be employed instead of the conditional statement 126(1) because both are included in the same group (e.g., group name "general").

The examples of FIGS. 4 and 5 may depict the configuration file(s) 122 as formatted according to a version of XML that at least complies with World Wide Web Consortium (W3C) XML 1.1 Specification published on Aug. 16, 2006. However, implementations are not limited to using XML or any particular version of XML for the configuration file(s) 122. The configuration file(s) 122 may be arranged according to any format, layout, or programming language.

Returning to FIG. 1, the configuration evaluation module 120 may employ the context information 114 to evaluate the conditional statement(s) 126 that are included in configuration section(s) 124 corresponding to a feature. Based on the configuration value 304 resulting from the evaluation, the content service module(s) 118 may determine one or more pages 128. In some cases, the configuration value 304 may be employed to determine whether to include or not include the feature in the page(s) 128. Alternatively, the configuration value 304 may be employed to determine a manner in which the feature is to be included in the page(s) 128. For example, the configuration value 304 may be a URL to be used to access header content, footer content, or a shopping cart to include in the page(s) 128, and different configuration files 122 may specify different URLs.

The page(s) 128 may include any type, or any amount, of content. The page(s) 128 may include text content, including any amount of alphanumeric or symbolic character text described using any character set or code page, such as any version or subset of the Unicode character standard. Text content may also include metadata described using a markup language, such as any version of HTML, DHTML, XHTML, XML, and so forth. The page(s) 128 may include script files or program modules that provide dynamic content using any scripting or programming language, including any version of JavaScript, VBScript, Perl, Common Gateway Interface (CGI), Cascading Style Sheets (CSS), other types of style sheets, and so forth. The page(s) 128 may include image content in any format, such as a version of the Joint Photographic Experts Group (JPEG) format, the Graphics Interchange Format (GIF), the Bitmap (BMP) image file format, and so forth. The page(s) 128 may also include audio, video, audio-visual, or multimedia content files in any format, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth. The page(s) 128 may also include any number and type of controls that enable a user to enter information or commands through the UI 106. Such controls may include text boxes, buttons, radio buttons, check boxes, drop-down menus, pop-up menus, list controls, tree controls, scroll controls, slider controls, and so forth.

The page(s) 128 may be communicated to the user devices 102 in response to the request 108. The application 104 may then cause the page(s) 128 to be presented within the UI 106 using a display device that is included in the user device 102 or external to the user device 102. In some implementations, the page(s) 128 may be configured dynamically with respect to receiving the request 108. Such dynamic configuration may be performed by processes that are within a same execution path as the receipt and analysis of the request 108. The dynamic configuration of the page(s) 128 may also be described as being performed in real time with respect to the receipt and analysis of the request 108, such that the dynamic configuration is performed within a (e.g., short) period of time following the receipt of the request 108. Alternatively, the configuration may be performed via static, or offline, operations that are performed prior to receipt of the request 108. For example, page(s) 128 may be configured according to a variety of (e.g., common) combinations of context values 116, such that the page(s) 128 are ready to be provided in response to subsequently received requests 108 that exhibit the combinations of context values 116.

In some implementations, a configuration that is dynamically determined in response to a request 108 may be cached or otherwise stored on the server device(s) 110 to avoid re-computation of the configuration in response to subsequently received requests 108. In some cases, a combination of context values 116 may be hashed and stored in a hash table to enable fast lookup of a configuration value 304 corresponding to a combination of context values 116. The hash table may include a mapping from a hashed combination of context values 116 to a resulting configuration value 304 for a feature. For example, a configuration value 304 may be a Boolean value indicating whether the gifting feature is to be enabled for page(s) 128. All possible combinations of context values 116 may be combined via a hash, and for each possible combination the hash table may indicate whether the configuration value 304 is true or false (e.g., gifting enabled or not enabled).

In some cases, the hashing may be performed in a lazy manner, such that a combination of context values 116 is hashed and stored in the hash table with the resulting configuration value 304 when a request 108 is received exhibiting the particular combination of context values 116. Alternatively, the hashing for a combination of context values 116 may be performed prior to receiving a request 108 that exhibits the combination of context values 116. In some cases, a particular configuration may include conditions on some but not all context values 116, such as conditions on device type 202 but not on location 204. In such cases, the hashing may be performed based on the context value(s) 116 that are included but not based on the context value(s) 116 that are excluded. In this way, the size of the hash table may be reduced and lookups may be performed faster than if all possible combinations were included.

Although FIG. 1 may depict an environment 100 in which the page(s) 128 are configured in response to a network request 108 for the page(s) 128, implementations are not so limited. In some implementations, the application 104 and the UI 106 may be executing on a same set of computing device(s) as the configuration evaluation module 120. In such cases, the context determination module 112 and the configuration evaluation module 120 may operate as a callable local service to configure the content to be presented via the UI 106.

Figure 6:
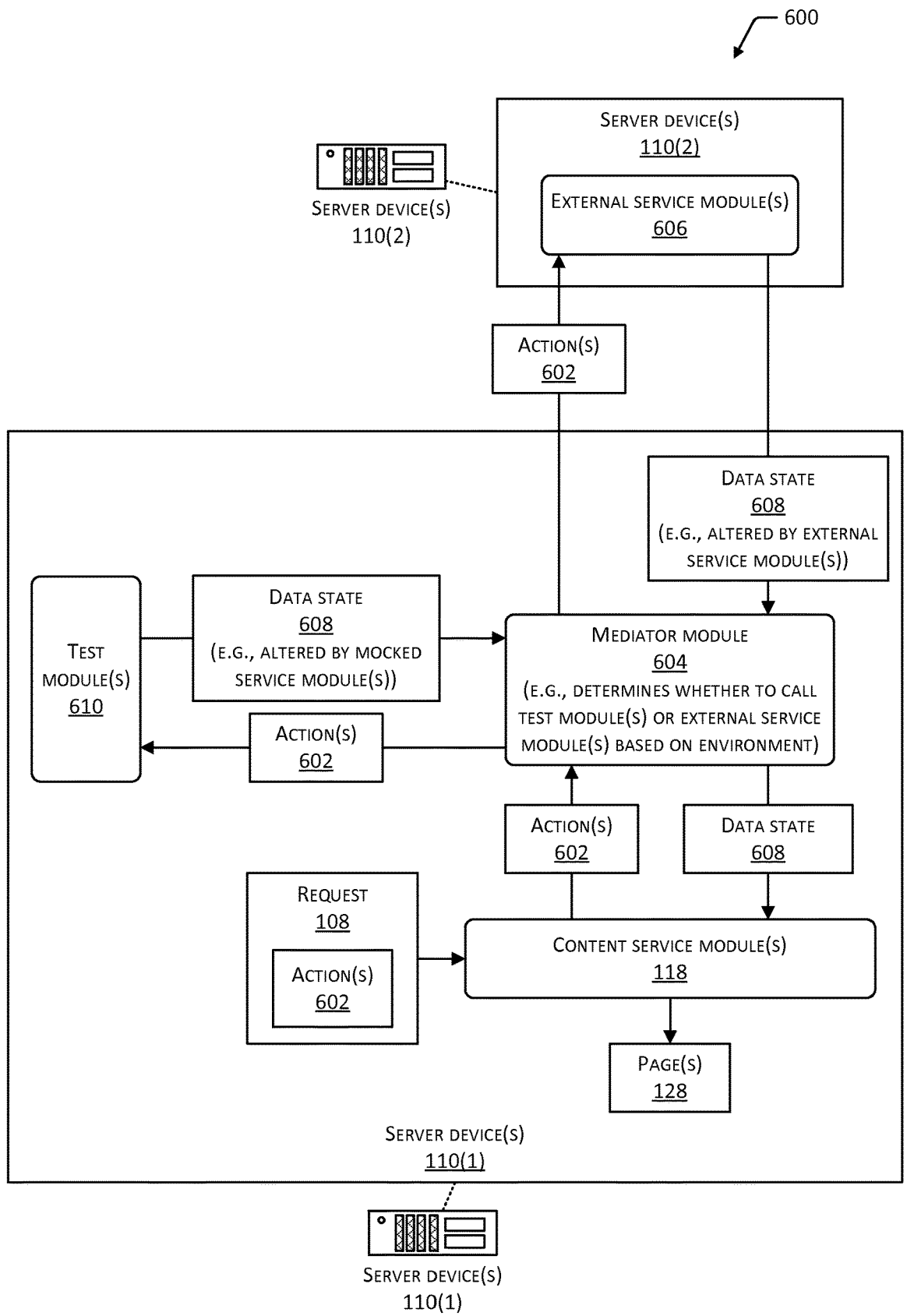
FIG. 6 depicts an environment in which test module(s) may be employed to determine a data state for one or more pages in response to one or more actions performed on the page(s).

FIG. 6 depicts an environment 600 in which implementations may operate. The elements of FIG. 6 may be configured similarly to like-numbered elements shown in FIG. 1, or may perform similar operations to those of like-numbered elements shown in FIG. 1. FIG. 6 depicts implementations in which test module(s) may be employed to determine a data state for one or more pages 128. The test module(s) may modify the data state, in some cases, to simulate the manner in which the data state may otherwise be modified via call(s) to external service(s).

In some implementations, the environment 600 may include one or more server devices 110(1) that execute one or more content service modules 118. The content service module(s) 118 may access a request 108. In some cases, as described above, the request 108 may be sent from an application 104 executing on a user device 102. The request 108 may include information indicating one or more actions 602 performed in the application 104 or the UI 106. For example, action(s) 602 may include information entered via one or more controls of a first set of pages 128 presented in the UI 106. The action(s) 602 may also include commands entered via the control(s) of the first set of pages 128. The first set of pages 128 may have been previously communicated and presented in the UI 106, and may have been generated based on a first data state.

A data state may include any number of data objects that include data to be presented in the page(s) 128 or data to be employed to determine how to present the page(s) 128. For example, in cases where the page(s) 128 are part of an online marketplace, the data state may include but is not limited to one or more of the following: information regarding a user currently logged into the online marketplace; item(s) in a shopping cart; item(s) previously browsed (e.g., browsing history); payment information; address information; item(s) currently presented; rating information; review information; and so forth.

The content service module(s) 118 may access the action(s) 602 described in the request 108. For example, the action(s) 602 may indicate that the user has provided a new or different shipping address as a destination for item(s) purchased through an online marketplace. In such cases, the action(s) 602 may include the shipping address as well as other information regarding the user. As another example, the action(s) 602 may indicate that the user is attempting to remove an item from a shopping cart. In such cases, the action(s) 602 may indicate the item that is to be removed. An action 602 may be described using one or more data objects.

The action(s) 602 may be provided to a mediator module 604 executing on the server device(s) 110(1). The mediator module 604 may identify a current execution environment in which the server device(s) 110(1) are operating. For example, the mediator module 604 may determine whether the server device(s) 110(1) are part of a test environment or part of a production environment as described above. In cases where the server device(s) 110(1) are in a production environment, the mediator module 604 may communicate the action(s) 602 to one or more external service modules 606 executing on one or more server devices 110(2). The external service module(s) 606 may perform any number of operations to modify the data state 608 of the UI 106 based on the action(s) 602. For example, in cases where the action(s) 602 include adding or changing a shipping address, the external service module(s) 606 may analyze the shipping address to determine whether the shipping address is valid. The data state 608 may then be altered to indicate whether the shipping address is valid or invalid.

In cases where the server device(s) 110(1) are in a test environment, the mediator module 604 may provide the action(s) 602 to one or more test modules 610 executing on the server device(s) 110(1) or elsewhere. The test module(s) 610 may include logic that alters the data state 608 in response to the action(s) 602. The test module(s) 610 may be called, instead of the external service module(s) 606, to modify the data state 608 based on the action(s) 602. In this way, the test module(s) 610 may simulate the modifications to the data state 608 that may otherwise be made by the external service module(s) 606 based on the action(s) 602.

Figure 7:
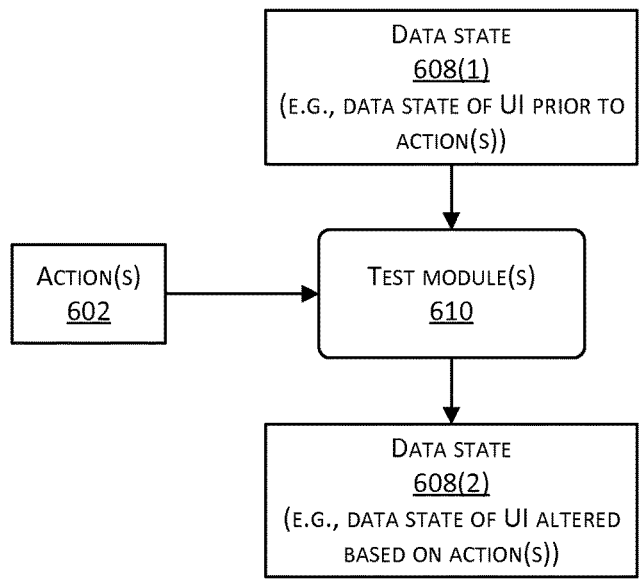
FIG. 7 depicts an example of modifying a data state for one or more pages based on one or more actions.

FIG. 7 depicts an example 700 of using the test module(s) 610 to alter the data state 608 based on the action(s) 602. As shown in FIG. 7, the test module(s) 610 may access a data state 608(1) that describes the state of the UI 106 prior to the action(s) 602. For example, the initial data state 608(1) may include a checkout page 128 with a shopping cart that includes multiple items for purchase. The test module(s) 610 may access the action(s) 602 and modify the data state 608(1) to generate an altered data state 608(2) based on the action(s) 602. For example, the action(s) 602 may indicate that a user (or an automated test program) is attempting to remove an item from the shopping cart or change a quantity of the item. The test module(s) 610 may generate a data state 608(2) that describes a successful, or unsuccessful, result of removing the item or changing the quantity. In some cases, the data state 608(2) may be generated based on hard-coded logic that determines an outcome of the action(s) 602. For example, to test situations in which the removal of an item from a shopping cart is not allowed, the test module(s) 610 may include logic that generates the data state 608(2) to describe an error in response to removing the item.

Returning to FIG. 6, the mediator module 604 may provide the data state 608 to the content service module(s) 118, the data state 608 having been modified by either the external service module(s) 606 or the test module(s) 610. The content service module(s) 118 may then generate a second set of pages 128 according to the data state 608. The second set of pages 128 may then be communicated to a user device 102 for presentation via the UI 106. For example, in cases where the action(s) 602 indicate a new or changed shipping address, and the test module(s) 610 include logic to indicate that the shipping address is invalid, the data state 608 may include an error message or other indication of an invalid address. In some implementations, the content service module(s) 118 may not be able to determine whether the data state 608 has been modified by the external service module(s) 606 or by the test module(s) 610. Accordingly, the use of the test module(s) 610 may facilitate testing of the content service module(s) 118 under a variety of data states in response to various action(s) 602.

In some cases, the test module(s) 610 may be configured to test for a variety of conditions that may be present in the data state(s) 608 that may be generated by the external service module(s) 606. For example, an action 602 may include inputting an address into the page(s) 128 and the test module(s) 610 may generate a simulated (e.g., mocked) data state 608 indicating a misspelling of a portion of the address information (e.g., Seatle instead of Seattle). In such cases, the data state 608 may include a suggestion for a correct spelling of the misspelled word(s). As another example, an action 602 may include changing a number of an item in a shopping cart. The simulated data state 608 may indicate an error condition in which the requested number of items is unavailable. As another example, an action 602 may include attempting to remove an item from a shopping cart. The initial data state 608(1) may indicate that the item is bundled to, coupled with, or otherwise associated with another item such that the first item may not be removed without also removing the other item. In such cases, the modified data state 608(2) may indicate an error condition or warning message to be presented in the UI 106, indicating that the item may not be removed independently of the other item.

The various devices of the environments 100 and 600 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. In some implementations, the communications between the various devices in the environments 100 and 600 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 8:
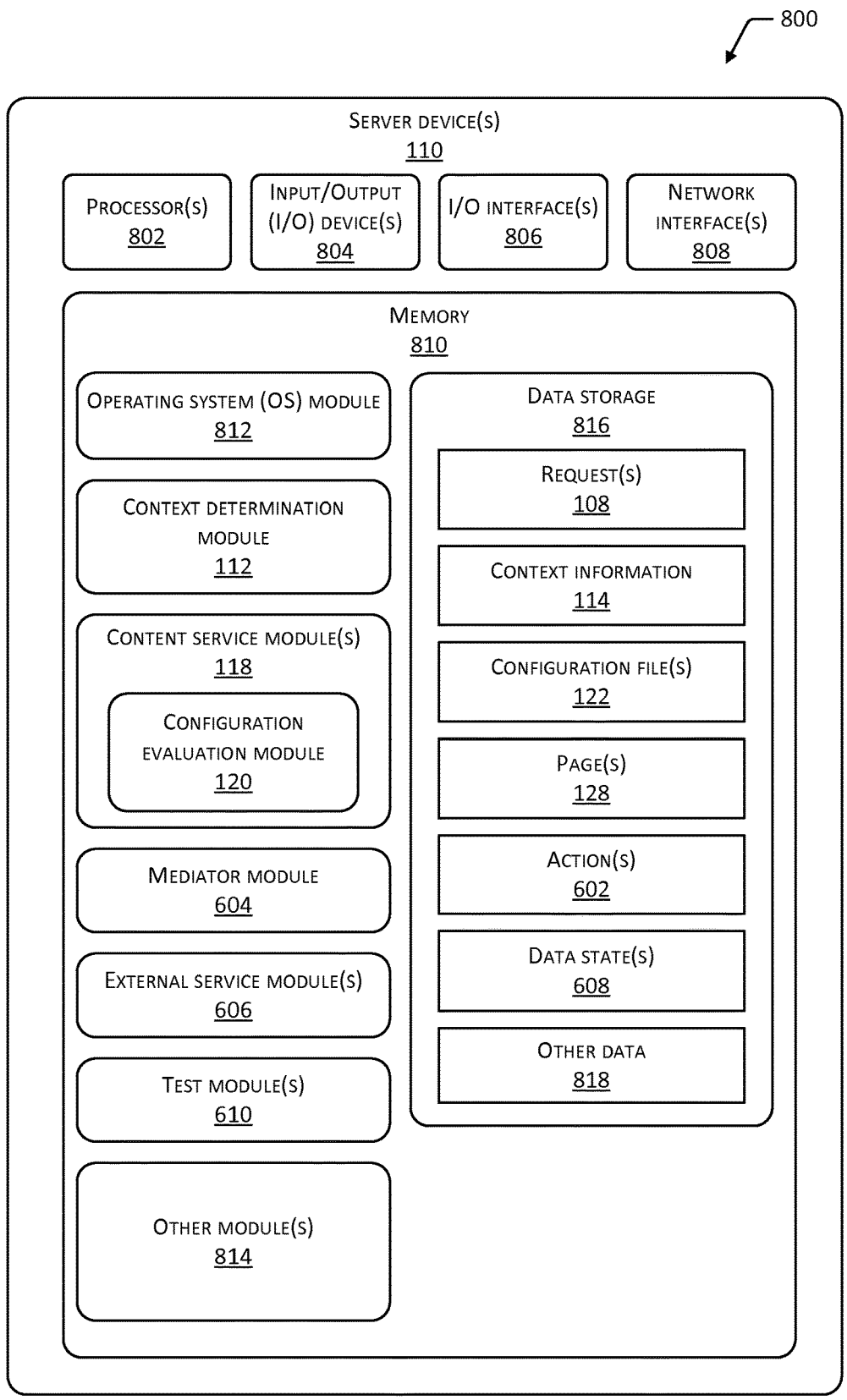
FIG. 8 depicts a block diagram of an example of server device(s) configured to determine one or more pages of content.

FIG. 8 depicts a block diagram 800 of an example of the server device(s) 110, such as those shown in FIGS. 1 and 6. As shown in the block diagram 800, the server device(s) 110 may include one or more processors 802 configured to execute one or more stored instructions of one or more software modules. The processor(s) 802 may include hardware-based processor(s) 802. The processor(s) 802 may comprise one or more cores.

The server device(s) 110 may include one or more input/output (I/O) devices 804. The I/O device(s) 804 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 804 may also include one or more output devices such as a display, an audio output device (e.g., a speaker), a printer, a haptic output device, and so forth. The I/O device(s) 804 may be physically incorporated with the server device(s) 110 or may be externally placed.

The server device(s) 110 may include one or more I/O interfaces 806 to enable components or modules of the server device(s) 110 to control, interface with, or otherwise communicate with the I/O device(s) 804. The I/O interface(s) 806 may enable information to be transferred in or out of the server device(s) 110, or between components of the server device(s) 110, through serial communication, parallel communication, or other types of communication. For example, the I/O interface(s) 806 may comply with a version of the RS-232 standard for serial ports, or with a version of the Institute of Electrical and Electronics Engineers (IEEE) 1284 standard for parallel ports. As another example, the I/O interface(s) 806 may be configured to provide a connection over Universal Serial Bus (USB) or Ethernet. In some cases, the I/O interface(s) 806 may be configured to provide a serial connection that is compliant with a version of the IEEE 1394 standard. The server device(s) 110 may also include one or more busses or other internal communications hardware or software that enables the transfer of data between the various modules and components of the server device(s) 110.

The server device(s) 110 may include one or more network interfaces 808 that enable communications between the server device(s) 110 and other network accessible computing devices, such as the user device(s) 102. The network interface(s) 808 may include one or more network interface controllers (NICs) or other types of transceiver devices configured to send and receive communications over one or more networks.

The server device(s) 110 may include one or more memories, described herein as memory 810. The memory 810 comprises one or more computer-readable storage media (CRSM). The CRSM may include one or more of an electronic storage medium, a magnetic storage medium, an optical storage medium, a quantum storage medium, a mechanical computer storage medium, and so forth. The memory 810 provides storage of computer-readable instructions describing data structures, program modules, processes, applications, or other data for the operation of the server device(s) 110. In some implementations, the memory 810 may provide storage of computer-readable instructions or other information in a non-transitory format. The memory 810 may comprise a computer-readable storage device that is incorporated into the server device(s) 110 or external to the server device(s) 110.

The memory 810 may include an OS module 812. The OS module 812 may be configured to manage hardware resources such as the I/O device(s) 804, the I/O interface(s) 806, and the network interface(s) 808. The OS module 812 may also be configured to provide various services to applications, processes, or modules executed by the processor(s) 802. The OS module 812 may include one or more of the following: any version of the Linux OS; any version of iOS or OS X from Apple Corp. of Cupertino, Calif., USA; any version of Windows or Windows Mobile from Microsoft Corp. of Redmond, Wash., USA; any version of Android from Google Corp. of Mountain View, Calif., USA and its derivatives from various sources; any version of Palm OS from Palm Computing, Inc. of Sunnyvale, Calif., USA and its derivatives from various sources; any version of BlackBerry OS from Research In Motion Ltd. of Waterloo, Ontario, Canada; any version of VxWorks from Wind River Systems of Alameda, Calif., USA; or other operating systems.

The memory 810 may include one or more of the modules described above as executing on the server device(s) 110, such as one or more of the context determination module 112, the content service module(s) 118, the configuration evaluation module 120, the mediator module 604, the external service module(s) 606, or the test module(s) 610. The memory 810 may also include one or more other modules 814, such as a user authentication module or an access control module to secure access to the server device(s) 110, a cryptographic module to secure communications to and from the server device(s) 110, and so forth.

The memory 810 may include, or have access to, data storage 816 which stores data for operations of the server device(s) 110. The data storage 816 may comprise a file system, database, array, structured list, tree, or other data structure, and may be a relational or a non-relational datastore. The data storage 816 may store any of the information described above as being present on the server device(s) 110, such as one or more of the request(s) 108, the context information 114, the configuration file(s) 122, the page(s) 128, the action(s) 602, or the data state(s) 608. The data storage 816 may also store other data 818 such as user authentication information, access control data, or other information. In some implementations, at least a portion of the information stored in the data storage 816 may be stored externally to the server device(s) 110 on other devices that may communicate with the server device(s) 110 via the I/O interface(s) 806 or the network interface(s) 808.

Figure 9:
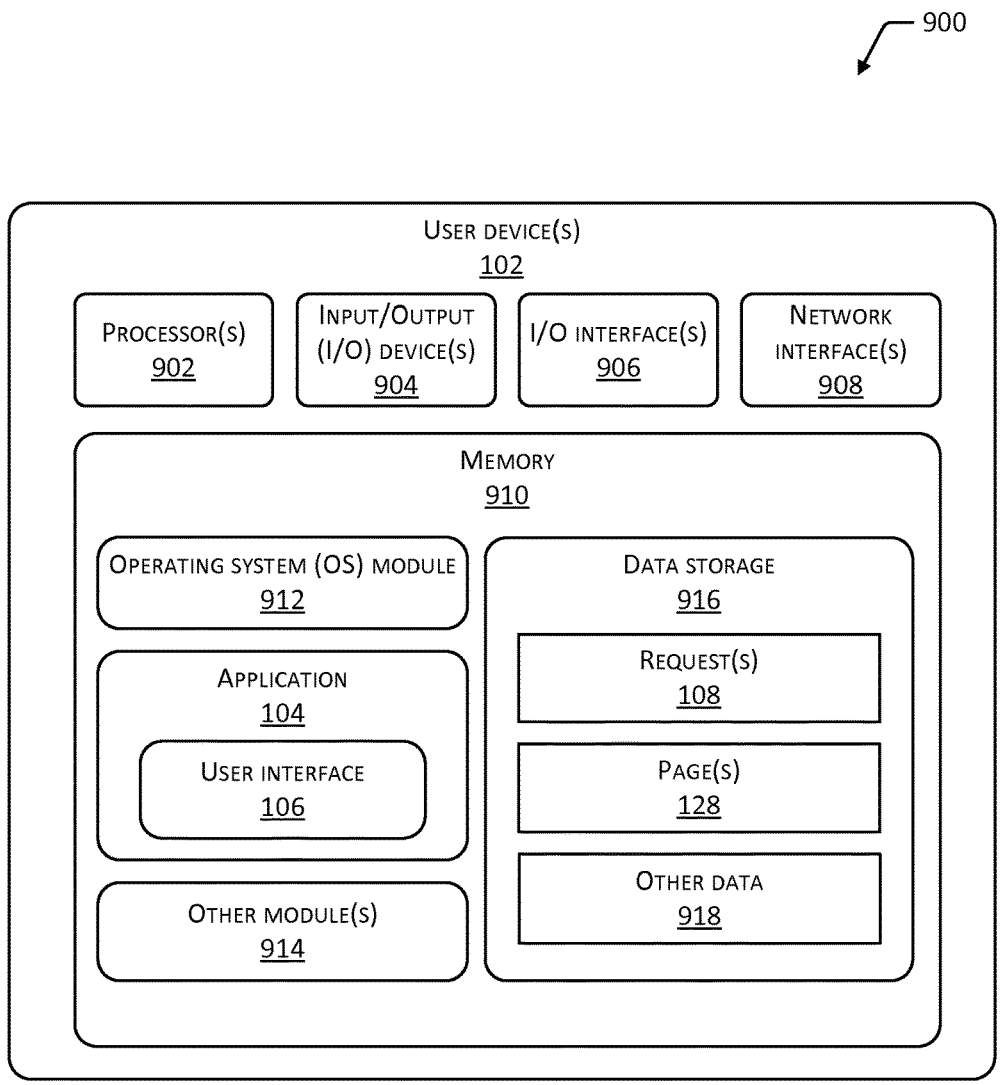
FIG. 9 depicts a block diagram of an example of one or more user devices configured to present one or more pages of content.

FIG. 9 depicts a block diagram 900 of an example of the user device(s) 102. As shown in the block diagram 900, the user device(s) 102 may include one or more processors 902 (e.g., hardware-based processor(s)) configured to execute one or more stored instructions. The processor(s) 902 may comprise one or more cores. The user device(s) 102 may include one or more I/O devices 904, one or more I/O interfaces 906, and one or more network interfaces 908 as described above respectively with reference to the I/O device(s) 804, the I/O interface(s) 806, and the network interface(s) 808.

The user device(s) 102 may include one or more memories, described herein as memory 910. The memory 910 comprises one or more CRSM, as described above with reference to the memory 810. The memory 910 may include an OS module 912 that is configured to manage resources such as the I/O device(s) 904, the I/O interface(s) 906, and the network interface(s) 908, and to provide various services to applications, processes, or modules executing on the processor(s) 902. The OS module 912 may include one or more of the operating systems described above with reference to the OS module 812.

The memory 910 may include one or more of the modules described above as executing on the user device(s) 102, such as one or more of the application 104 or the UI 106. In cases where one or more of the application 104 or the UI 106 executes within a web browser, the memory 910 may also include the web browser. The memory 910 may also include one or more other modules 914, such as a user authentication module or an access control module to secure access to the user device(s) 102, a cryptographic module to secure communications to and from the user device(s) 102, and so forth.

The memory 910 may include data storage 916, which may store data for operations of the user device(s) 102. The data storage 916 may comprise a database, array, structured list, tree, or other data structure, and may be a relational or a non-relational datastore. The data storage 916 may store data such as that described above as present on the user device(s) 102, including one or more of the request(s) 108 or the page(s) 128. The data storage 916 may also store other data 918, such as user authentication information or access control data. In some implementations, at least a portion of the information stored in the data storage 916 may be stored externally to the user device(s) 102 on other devices that may communicate with the user device(s) 102 via the I/O interface(s) 906 or via the network interface(s) 908.

Figure 10:
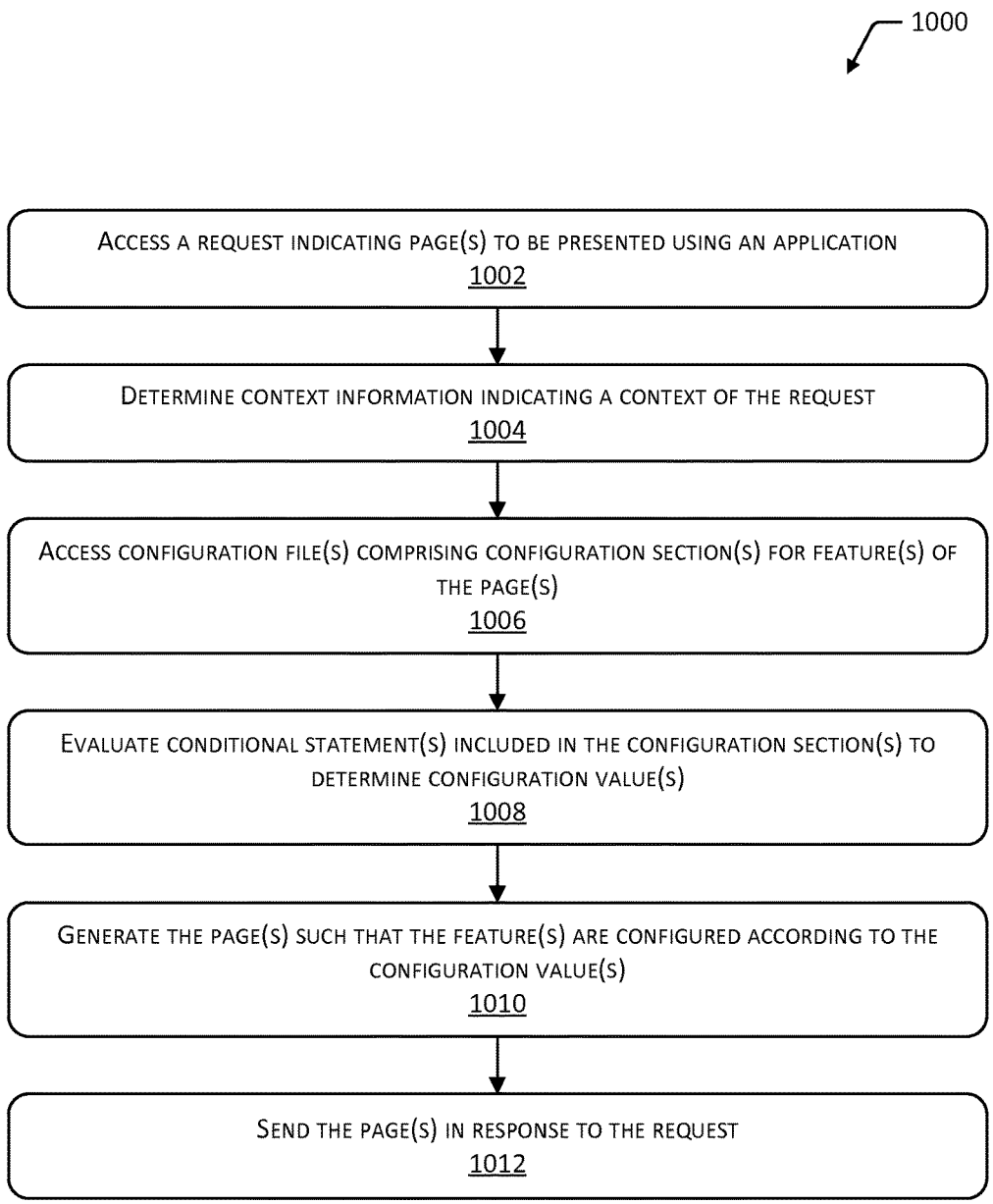
FIG. 10 depicts a flow diagram of a process for configuring one or more pages of content based on context information.

FIG. 10 depicts a flow diagram 1000 of a process for configuring one or more pages 128 of content based on one or more dimensions 306 of context information 114. Operations of the process may be performed by one or more of the context determination module 112, the content service module(s) 118, the configuration evaluation module 120, the other module(s) 814 executing on the server device(s) 110, the application 104, the UI 106, the other module(s) 914 executing on the user device(s) 102, or other modules executing on other device(s).

At 1002, a request 108 may be accessed. As described above, the request 108 may be generated and communicated by an application 104 executing on a user device 102 and may indicate one or more pages 128 to be presented using the application 104. In some cases, the requested page(s) 128 may be included in an online marketplace.

At 1004, the context information 114 may be determined. As described above, the context information 114 may indicate a context of the request 108. The context information 114 may include a context value 116 for each of one or more dimensions 306.

At 1006, one or more configuration files 122 may be accessed. As described above, the configuration file(s) 122 may include configuration section(s) 124 corresponding to features that may be included in the generated page(s) 128.

At 1008, one or more conditional statements 126 included in the configuration section(s) 124 for feature(s) may be evaluated, based on the context information 114, to determine configuration value(s) 304.

At 1010, the page(s) 128 may be generated to include (or not include) the feature(s) configured according to the configuration value(s) 304 determined at 1008. In some cases, the configuration value 304 for a feature may be a Boolean indication of whether the feature is to be included or not included. Alternatively, the configuration value 304 may provide information enabling the configuration of the feature. For example, the configuration value 304 may be a URL of a header, footer, shopping cart, or other content to be presented in the page(s) 128.

At 1012, the page(s) 128 may be communicated to the user device 102 in response to the request 108.

Figure 11:
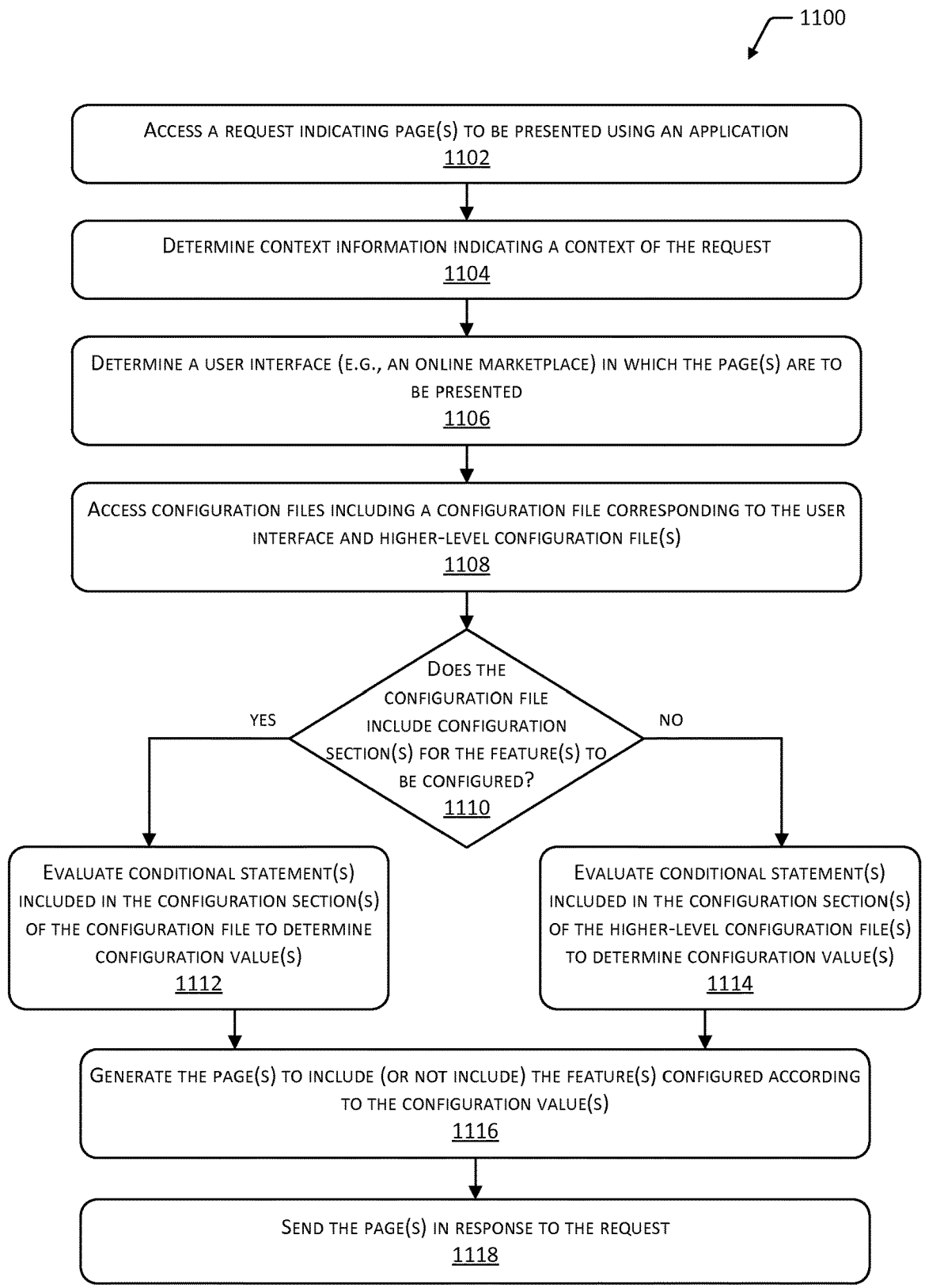
FIG. 11 depicts a flow diagram of a process for configuring one or more pages, including overriding configuration information included in a first configuration file with configuration information included in a second configuration file.

FIG. 11 depicts a flow diagram 1100 of a process for configuring one or more pages 128, including overriding configuration information included in a first configuration file 122(1) with configuration information included in a second configuration file 122(2). Operations of the process may be performed by one or more of the context determination module 112, the content service module(s) 118, the configuration evaluation module 120, the other module(s) 814 executing on the server device(s) 110, the application 104, the UI 106, the other module(s) 914 executing on the user device(s) 102, or other modules executing on other device(s).

At 1102, a request 108 may be accessed. As described above, the request 108 may be generated and communicated by an application 104 executing on a user device 102 and may indicate one or more pages 128 to be presented using the application 104. In some cases, the requested page(s) 128 may be included in an online marketplace.

At 1104, the context information 114 may be determined. As described above, the context information 114 may indicate a context of the request 108.

At 1106, a particular UI 106 may be determined in which the page(s) 128 are to be presented. For example, the UI 106 may be a particular online marketplace. In some cases, the UI 106 may be indicated by the URL or other information included in the request 108.

At 1108, the configuration file(s) 122 may be accessed. In some cases, the configuration files 122 may include a higher level (e.g., generic) configuration file 122(1) applicable to a plurality of UIs 106 and a lower level (e.g., UI-specific) configuration file 122(2) applicable to the particular UI 106 associated with the requested page(s) 128.

At 1110, a determination is made whether the configuration file 122(2) includes configuration section(s) 124 for the feature(s) to be configured in the page(s) 128. If so, the process may proceed to 1112 and evaluate the conditional statement(s) 126 included in the configuration section(s) 124 of the configuration file 122(2) to determine the configuration value(s) 304 for configuring the feature(s). The process may then proceed to 1116.

If it is determined at 1110 that the configuration file 122(2) does not include configuration section(s) 124 for the feature(s), the process may proceed to 1114. At 1114, the conditional statement(s) 126 included in the configuration section(s) 124 of the (e.g., generic) configuration file 122(1) may be evaluated to determine the configuration value(s) 304 for the feature(s). The process may then proceed to 1116.

At 1116, the page(s) 128 may be generated to include (or not include) the feature(s) configured according to the configuration value(s) 304 determined at 1112 or 1114.

At 1118, the page(s) 128 may be communicated to the user device 102 in response to the request 108.

Figure 12:
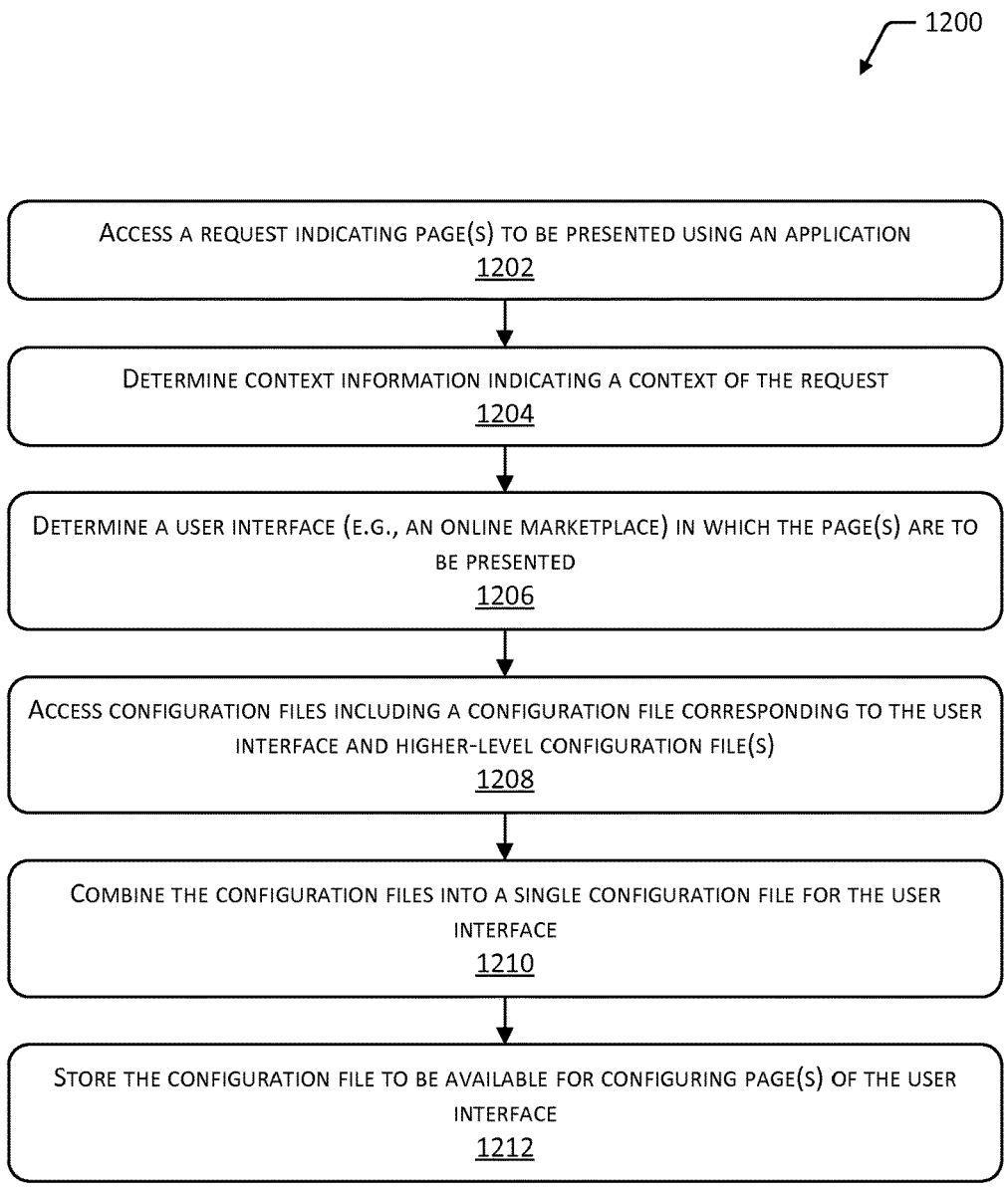
FIG. 12 depicts a flow diagram of a process for combining configuration information included in multiple configuration files to generate a single configuration file for configuring page(s) of a user interface.

FIG. 12 depicts a flow diagram 1200 of a process for combining configuration information included in multiple configuration files 122 to generate a single configuration file 122 for configuring page(s) 128 of a UI 106. Operations of the process may be performed by one or more of the context determination module 112, the content service module(s) 118, the configuration evaluation module 120, the other module(s) 814 executing on the server device(s) 110, the application 104, the UI 106, the other module(s) 914 executing on the user device(s) 102, or other modules executing on other device(s).

At 1202, a request 108 may be accessed. As described above, the request 108 may be generated and communicated by an application 104 executing on a user device 102 and may indicate one or more pages 128 to be presented using the application 104. In some cases, the requested page(s) 128 may be included in an online marketplace.

At 1204, the context information 114 may be determined. As described above, the context information 114 may indicate a context of the request 108.

At 1206, a particular UI 106 may be determined in which the page(s) 128 are to be presented. For example, the UI 106 may be a particular online marketplace. In some cases, the UI 106 may be indicated by the URL or other information included in the request 108.

At 1208, the configuration file(s) 122 may be accessed. In some cases, the configuration files 122 may include a higher level (e.g., generic) configuration file 122(1) applicable to a plurality of UIs 106 and a lower level (e.g., UI-specific) configuration file 122(2) applicable to the particular UI 106 associated with the requested page(s) 128.

At 1210, the configuration files 122 may be combined to generate a single configuration file 122 to be employed for configuring the UI 106. In some implementations, the combination may include replacing the configuration section(s) 124 present in the higher-level configuration file(s) 122 with corresponding configuration section(s) 124 present in lower-level configuration file(s) 122 to generate the single configuration file 122. In the example of FIG. 5, the single configuration file 122 may be generated to include the configuration section 124(2) instead of the configuration section 124(1).

At 1212, the single configuration file 122 generated at 1210 may be stored or otherwise made available for use in configuring the page(s) 128 of the UI 106, as described above. In some implementations, the combination described with respect to FIG. 12 may be performed offline prior to receiving the request 108, such that the single configuration file 122 for the UI 106 is available for use when the request 108 is received for page(s) 128 of the UI 106.

Figure 13:
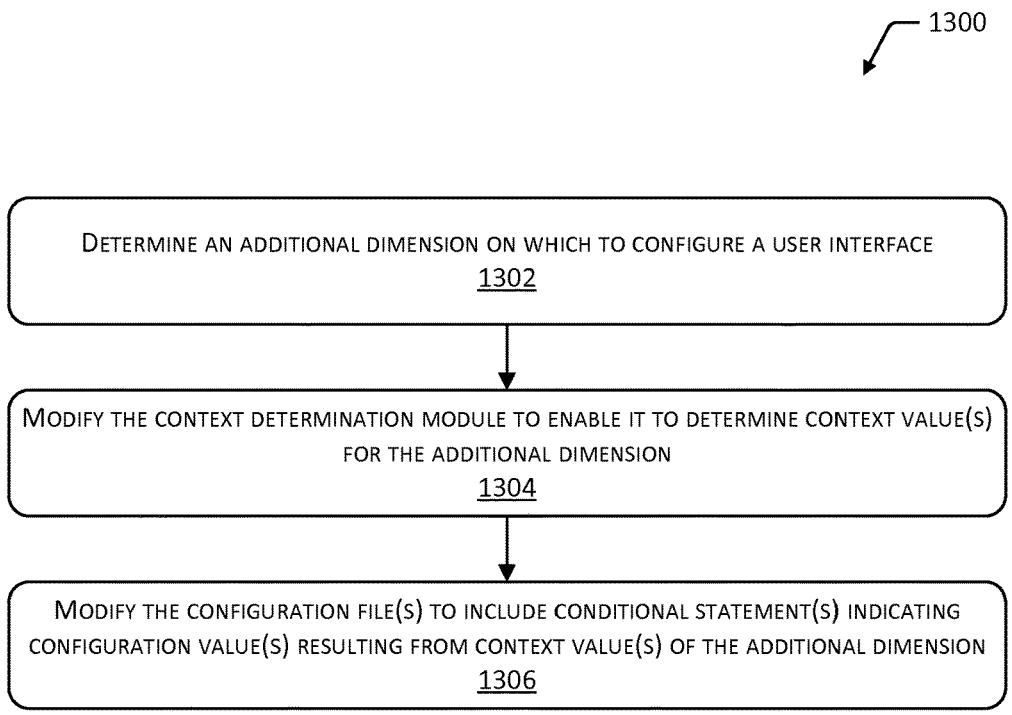
FIG. 13 depicts a flow diagram of a process for modifying a configuration system to support configuration of page(s) based on an additional dimension of context information.

FIG. 13 depicts a flow diagram 1300 of a process for modifying a configuration system to support configuration of the page(s) 128 based on an additional dimension of context value(s) 116. Operations of the process may be performed by one or more of the context determination module 112, the content service module(s) 118, the configuration evaluation module 120, the other module(s) 814 executing on the server device(s) 110, the application 104, the UI 106, the other module(s) 914 executing on the user device(s) 102, or other modules executing on other device(s).

At 1302, an additional dimension may be determined on which a UI 106 (e.g., an online marketplace) may be configured. For example, a determination may be made that configuration is to be further based on the context value 116 for the user information 206 such as a type of user or a particular set of one or more users.

At 1304, the context determination module 112 may be modified to determine the current context value(s) 116 for the additional dimension based on the request 108 or a current execution environment. For example, the context determination module 112 may be modified to analyze the request 108 and determine, based on parameters, cookies, or other information, the current user that generated the request 108. A category, type, or class of the current user may then be determined by comparing the ID of the current user to a database or other information describing the category, type, or class of various users. In some cases, the context determination module 112 may be modified to include a new interface or other logic that is designed to extract the context value(s) 116 for the new dimension from the request 108 or other sources, and store the context value(s) 116 in the context information 114 to be accessible by the configuration evaluation module 120.

After the context determination module 112 has been modified, a notification may be sent to engineers, developers, or other individuals who are responsible for a particular UI 106 such as an online marketplace of a merchant. The notification may indicate that the additional dimension is available for configuring page(s) 128 of the UI 106.

At 1306, the configuration file(s) 122 may be modified based on the newly supported dimension. Such modification(s) may include adding conditional statement(s) 126 to configuration section(s) 124 of the configuration file(s) 122, the conditional statement(s) 126 enabling the determination of the configuration value(s) 304 based on context value(s) 116 of the new dimension. In some implementations, the modifications described at 1304 and 1306 may be performed (e.g., manually) by one or more individuals. Alternatively, the modifications may be performed by one or more modules executing on the server device(s) 110 or elsewhere.

At least some implementations also support the removal or deprecation of dimensions from the configuration system. In some implementations, a determination may be made that a particular dimension is to be no longer available for configuring page(s) 128 after a certain date or time in the future (e.g., in one month). In such cases, the configuration evaluation module 120 may track the uses of context value(s) 116 for that dimension in the conditional statement(s) 126. A notification may be sent to the individual(s) who are responsible for (e.g., own) the configuration file(s) 122 that included the conditional statement(s) 126. The notification may warn the individual(s) that the dimension is to be deprecated and no longer available after the date or time, to enable the individual(s) to modify the configuration file(s) 122 accordingly.

Figure 14:
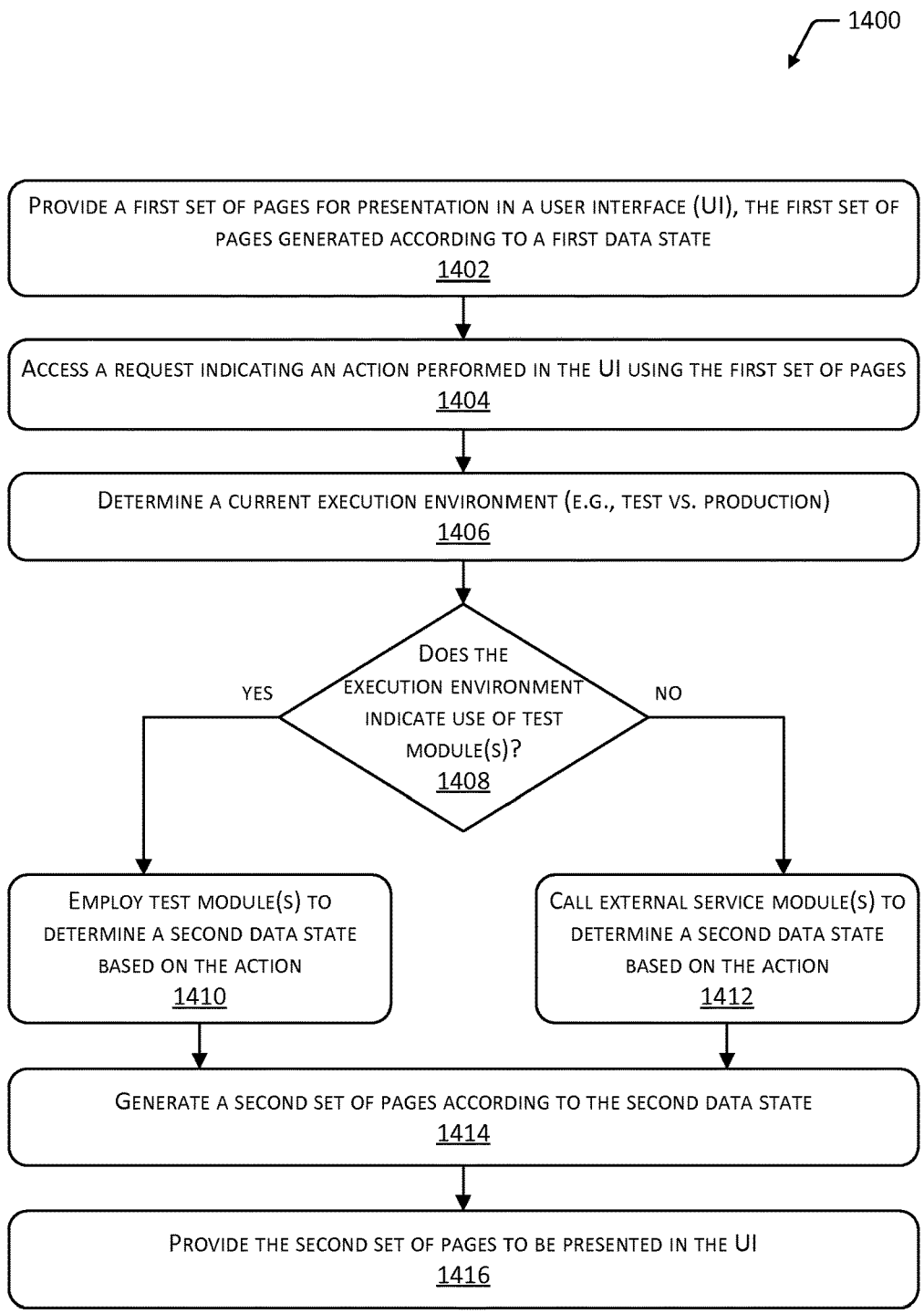
FIG. 14 depicts a flow diagram of a process for employing test module(s) to determine a data state for one or more pages in response to one or more actions performed on the page(s).

FIG. 14 depicts a flow diagram 1400 of a process for employing test module(s) 610 to determine a data state 608 for one or more pages 128 in response to an action 602 performed on the page(s) 128. Operations of the process may be performed by one or more of the context determination module 112, the content service module(s) 118, the configuration evaluation module 120, the mediator module 604, the external service module(s) 606, the test module(s) 610, the other module(s) 814 executing on the server device(s) 110, the application 104, the UI 106, the other module(s) 914 executing on the user device(s) 102, or other modules executing on other device(s).

At 1402, a first set of pages 128 may be provided for presentation in a UI 106. As described above with reference to FIGS. 6 and 7, the first set of pages 128 may be generated according to a first data state 608(1). The first set of pages 128 may include one or more pages 128.

At 1404, a request 108 is accessed. The request 108 may indicate an action 602 performed in the UI 106 using the first set of pages 128.

At 1406, a current execution environment is determined. For example, a determination may be made whether the current execution environment is a test environment or a production environment.

At 1408, a determination is made whether the current environment indicates that the data state 608(1) is to be modified using test module(s) 610 or via calls to the external service module(s) 606. If the current environment indicates use of the test module(s) 610 (e.g., in a test environment), the process may proceed to 1410. If the current environment indicates use of the external service module(s) 606 (e.g., in a production environment), the process may proceed to 1412.

At 1410, the test module(s) 610 may be employed to modify the first data state 608(1) based on the action 602, to generate a second data state 608(2). The process may then proceed to 1414.

At 1412, one or more calls may be made to the external service module(s) 606. Such call(s) may enable the external service module(s) 606 to alter the first data state 608(1) based on the action 602, to generate the second data state 608(2). The process may then proceed to 1414.

At 1414, a second set of pages 128 is generated according to the second data state 608(2). At 1416, the second set of pages 128 may be provided for presentation in the UI 106. The second set of pages 128 may include one or more pages 128.

The process of FIG. 14 may be repeated any number of times for additional received action(s) 602. For example, another request 108 may be received indicating additional action(s) 602 performed using the second set of pages 128. A third data state 608 may be determined based on call(s) to the test module(s) 610 or the external service module(s) 606, and a third set of pages 128 may be generated based on the third data state 608. Although examples herein may describe the action(s) 602 as being performed by a user manipulating control(s) of the page(s) 128, in some cases the action(s) 602 may be performed by a program, script, or other automated process (e.g., a test script).

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether unmodulated or modulated using a carrier, may include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
   accessing a current request for content sent from a first device, the current request identifying web content of at least one web page to be presented using an application of the first device, the web content including at least one feature;
   analyzing a context of the current request from the first device to determine context information, the context information indicating the at least one feature of the web content and comprising one or more context values of the first device that are indicative of one or more of:
      a device type of the first device;
      a location of the first device;
      a user of the first device;
      an application type of the application; or
      a first environment in which the current request from the first device is accessed;
   accessing a first configuration file and a second configuration file, the first configuration file comprising a first configuration section for the at least one feature of the at least one web page for presentation on the first device, the second configuration file comprising a second configuration section for the at least one feature of the at least one web page for presentation on the first device, the first configuration section comprising one or more first conditional statements that indicate a first configuration value corresponding to the one or more context values, the second configuration section comprising one or more second conditional statements that indicate a second configuration value corresponding to the one or more context values, the first configuration value or the second configuration value to configure the at least one feature in the web content;
   combining the first configuration file and the second configuration file to generate a third configuration file, the first configuration section of the first configuration file replaced by the second configuration section from the second configuration file in the third configuration file;
   based on the one or more context values of the first device indicated by the context information, evaluating the one or more second conditional statements to determine second configuration values associated with the first device and corresponding to the one or more context values;
   generating, using program logic that is separate from the first configuration file and the second configuration file, the web content of the at least one web page to include the at least one feature configured for presentation on the first device according to the second configuration values;
   sending, in response to the current request from the first device, the at least one feature of the web content of the at least one web page to the first device to cause the application to present the at least one feature of the web content according to the second configuration values;
   receiving an input corresponding to the at least one web page;
   employing one or more test modules to validate the input for determining a data state, wherein the one or more test modules:
      determine an environment associated with operation of the one or more test modules is a second environment or a third environment;
      in response to the second environment, generate at least a second web page according to the data state; and
      in response to the third environment, call one or more external service modules for determining the data state is based on the input.

2. The method of claim 1, wherein:
the first configuration file is applicable to a plurality of online marketplaces; and
the second configuration file is applicable to an online marketplace of the plurality of online marketplaces, the online marketplace including the web content of the at least one web page indicated by the context of the current request; and
the method further comprising:
   replacing the first configuration section with the second configuration section in the third configuration file; and
   employing the third configuration file to determine the second configuration values for configuring the at least one feature of the web content.

3. The method of claim 1, wherein:
the web content of the at least one web page is included in an online marketplace; and
the determining the second configuration values comprise determining one or more of:
   a multi-page value indicating whether the web content of the at least one web page is to be presented as a single web page or multiple web pages;
   a gift wrap value indicating whether a gift wrap feature is to be included in the web content of the at least one web page;
   a gift message value indicating whether a gift message feature is to be included in the at least one web page;
   a cart Uniform Resource Locator (URL) of a shopping cart;
   a header URL of a header to be presented in the web content of the at least one web page; or
   a footer URL of a footer to be presented in the web content of the at least one web page.

4. The method of claim 1, further comprising:
determining a dimension for configuring the web content of the at least one web page;
modifying a context determination module to determine one or more additional context values for the dimension, the context determination module configured to determine the context information; and
modifying one or more of the first configuration file or the second configuration file to include one or more additional conditional statements that indicate the second configuration values resulting from the one or more additional context values.

5. A system, comprising:
at least one computing device configured to implement one or more service modules, the one or more service modules configured to:
  access a current request from a first device for content comprising one or more of a first set of web pages or a second set of web pages, the content including a first feature to be presented within a user interface (UI) of the first device;
  analyze a context of the current request from the first device to determine context information indicating the first feature and including one or more context values associated with particular characteristics of the first device;
  access at least one configuration file specific to the UI of the first device, the at least one configuration file comprising a configuration section for the first feature for presentation on the first device by the UI based on the one or more context values, the configuration section comprising a first conditional statement corresponding to a configuration value for a first context value;
  evaluate the first conditional statement based on the one or more context values to determine respective configuration values associated with the first device;
  generate the first set of web pages according to a first data state, the first data state comprising a plurality of data objects, the first set of web pages comprising the first feature configured according to the respective configuration values;
  provide, in response to the current request from the first device, the first set of web pages including the first feature;
  receive an input corresponding to at least one of the first set of web pages; and
  employ one or more test modules to validate the input to determine a second data state, the one or more test modules to:
    determine an environment associated with operation of the one or more test modules is a first environment or a second environment;
    in response to the first environment, generate the second set of web pages according to the second data state; and
    in response to the second environment, call one or more external service modules to determine the second data state is based on the input.

6. The system of claim 5, wherein the one or more context values determined from the context of the current request comprise one or more of:
  a device type of the first device that sent the current request;
  a location of the first device;
  a user of the first device;
  an application type of an application to be employed in presenting the one or more of the first set of web pages or the second set of web pages;
  a weblab that includes the user; or
  an environment in which the current request is accessed.

7. The system of claim 5, wherein the at least one configuration file is arranged according to a version of Extensible Markup Language (XML) that at least complies with World Wide Web Consortium (W3C) XML 1.1 Specification published on Aug. 16, 2006.

8. The system of claim 5, wherein:
  the respective configuration values are Boolean values; and
  generating the first set of web pages further comprises:
    generating the first set of web pages to include the first feature, responsive to the respective configuration values including a first value; or
    generating the set of web pages to not include the first feature, responsive to the respective configuration values including a second value.

9. The system of claim 5, wherein the respective configuration values comprise one or more of:
  a multi-page value indicating whether the one or more of the first set of web pages or the second set of web pages are to be presented as a single web page or multiple web pages;
  a header Uniform Resource Locator (URL) of a header to be presented in the one or more of the first set of web pages or the second set of web pages;
  a footer URL of a footer to be presented in the one or more of the first set of web pages or the second set of web pages; or
  a prefetch value indicating a number of prefetches to be performed for the one or more of the first set of web pages or the second set of web pages.

10. The system of claim 5, wherein:
  the at least one configuration file comprises:
    a first configuration file corresponding to a plurality of UIs, the first configuration file including a first configuration section; and
    a second configuration file corresponding to the plurality of UIs that includes web content of the one or more of the first set of web pages or the second set of web pages associated with the context of the current request,
  the second configuration file includes a second configuration section for the first feature; and
  the one or more service modules are further configured to:
    override the first configuration section with the second configuration section, including accessing the second configuration file responsive to determining that the first feature is included in the plurality of UIs corresponding to the second configuration file; and
    evaluate the first conditional statement included in the second configuration section.

11. The system of claim 5, wherein:
  the first feature of the first set of web pages includes at least one checkout web page for an online marketplace;
  the first data state includes a first shipping address;
  an action changes the first shipping address to a second shipping address;
  the one or more external service modules are configured to determine a validity of the second shipping address; and
  the one or more test modules determine the second data state to indicate that the second shipping address is invalid.

12. One or more non-transitory computer-readable media storing instructions which, when executed by at least one processor, instruct the at least one processor to:
  access a request from a first device, the request identifying web content of a first web page;
  analyze the request to determine context information indicating a first feature of the web content, the context information including characteristic data associated with the first device and a context associated with the request;
  access a first file comprising a first configuration section for the first feature of the web content, the first configuration section comprising one or more first conditional statements to determine a first configuration value based on the context information;

access a second file comprising a second configuration section for the first feature of the web content, the second configuration section comprising one or more second conditional statements;

combine the first file and the second file to generate a third file, the second configuration section replacing the first configuration section in the third file;

evaluate, based on the context information, the one or more second conditional statements in the third file to determine a second configuration value;

provide, in response to the request, the web content to the first device for presentation;

generate second web content including the first feature configured for presentation on the first device according to the second configuration value;

provide, in response to the request, the second web content the first device for presentation;

receive an input corresponding to the first web page;

validate the input to determine a data state;

determine an environment is one or more of a first environment or a second environment;

in response to the first environment, generate a second web page according to the data state; and in response to the second environment, call one or more external services to determine the data state is based on the input.

13. The one or more non-transitory computer-readable media of claim 12, wherein:

the web content of the first web page is included in an online marketplace; and the second configuration value comprises one or more of:
a multi-page value indicating whether the second web content of the first web page is to be presented as a single web page or multiple web pages;
a gift wrap value indicating whether a gift wrap feature is to be included in the second web content of the first web page;
a gift message value indicating whether a gift message feature is to be included in the second web content of the first web page;
a cart Uniform Resource Locator (URL) of a shopping cart;
a header URL of a header to be presented in the second web content of the first web page; or
a footer URL of a footer to be presented in the second web content of the first web page.

14. The one or more non-transitory computer-readable media of claim 12, wherein:

the second configuration value includes at least one Boolean value; and generating the second web content of the first web page further comprises one or more of:
generating the second web content of the first web page to include the first feature, responsive to the second configuration value including a first value; or
generating the second web content of the first web page to not include the first feature, responsive to the second configuration value.

15. The one or more non-transitory computer-readable media of claim 12, wherein the context information comprises one or more of:

a device type of the first device;
a location of the first device;
a user of the first device;
an application type of an application to be employed in presenting the web content of the first web page;
a weblab that includes the user; or
an environment in which the first feature is accessed.

16. The one or more non-transitory computer-readable media of claim 12, wherein:

the first configuration section includes a first conditional statement indicating that the first feature is to be omitted from the second web content of the first web page based at least in part on the context information;

the second configuration section includes a second conditional statement indicating that the first feature is to be included in the second web content of the first web page based at least in part on the context information; and the instructions further instruct the at least one processor to generate the first feature of the first web page based on the one or more second conditional statements.

17. The one or more non-transitory computer-readable media of claim 12, wherein:

the first configuration section includes a first conditional statement indicating, for the context information, the first configuration value is a first Uniform Resource Locator (URL) of content to be included in the web content of the first web page;

the second configuration section includes a second conditional statement indicating, for the context information, the second configuration value is a second URL of content to be included in the web content of the first web page; and the instructions further instruct the at least one processor to generate the web content of the first web page to include the second URL based on the second conditional statement.

* * * * *

UNITED STATES PATENT AND TRADEMARK OFFICE
CERTIFICATE OF CORRECTION

PATENT NO. : 10,740,831 B1
APPLICATION NO. : 14/617760
DATED : August 11, 2020
INVENTOR(S) : Luc Ferron Page 1 of 1

It is certified that error appears in the above-identified patent and that said Letters Patent is hereby corrected as shown below:

In the Claims

Column 26, Claim 1, Line 10:
Currently reads: "page;"
Where it should read --page; and--

Column 29, Claim 12, Line 20:
Currently reads: "content the first device for presentation"
Where it should read --content to the first device for presentation--

Signed and Sealed this
Thirteenth Day of October, 2020

Andrei Iancu
*Director of the United States Patent and Trademark Office*